(12) United States Patent
Joo et al.

(10) Patent No.: US 11,626,617 B2
(45) Date of Patent: Apr. 11, 2023

(54) GEL ELECTROLYTES AND THE MANUFACTURE THEREOF

(71) Applicant: Cornell University, Ithaca, NY (US)

(72) Inventors: Yong Lak Joo, Ithaca, NY (US); Jin Hong Lee, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 644 days.

(21) Appl. No.: 16/614,122

(22) PCT Filed: May 16, 2018

(86) PCT No.: PCT/US2018/032971
§ 371 (c)(1),
(2) Date: Nov. 15, 2019

(87) PCT Pub. No.: WO2018/213447
PCT Pub. Date: Nov. 22, 2018

(65) Prior Publication Data
US 2020/0153040 A1   May 14, 2020

Related U.S. Application Data

(60) Provisional application No. 62/506,980, filed on May 16, 2017.

(51) Int. Cl.
| | |
|---|---|
| *H01M 10/0565* | (2010.01) |
| *C08G 77/18* | (2006.01) |
| *C08G 77/20* | (2006.01) |
| *C08L 83/06* | (2006.01) |
| *H01M 10/0525* | (2010.01) |

(Continued)

(52) U.S. Cl.
CPC ........ *H01M 10/0565* (2013.01); *C08G 77/18* (2013.01); *C08G 77/20* (2013.01); *C08L 83/06* (2013.01); *H01M 10/0525* (2013.01); *H01M 10/0583* (2013.01); *H01M 10/0587* (2013.01);
(Continued)

(58) Field of Classification Search
CPC ........ H01M 10/0565; H01M 10/0525; H01M 10/0583; H01M 10/0587; H01M 2300/0082; H01M 2300/0085; H01M 50/411; C08G 77/18; C08G 77/20; C08L 83/06
See application file for complete search history.

(56) References Cited

U.S. PATENT DOCUMENTS

2013/0144025 A1   6/2013   Hwang et al.
2016/0372730 A1   12/2016   Uchida et al.

FOREIGN PATENT DOCUMENTS

WO   2017/030811 A1   2/2017

OTHER PUBLICATIONS

KR20140126983A translation (Year: 2014).*
(Continued)

*Primary Examiner* — Jane J Rhee
(74) *Attorney, Agent, or Firm* — Paul J. Roman, Jr.; Johnson, Marcou, Isaacs & Nix, LLC

(57) ABSTRACT

Provided herein are a variety of electrolytes, electrolyte systems, and separator systems, as well as batteries comprising the same and precursors thereof. In specific embodiments are semi-solid or gel electrolytes, particularly those prepared using (i) a cross-linkable polysilsesquioxane with high ionic conductivity and (ii) a liquid electrolyte (e.g., ionic liquid).

48 Claims, 13 Drawing Sheets

(51) Int. Cl.
*H01M 10/0583* (2010.01)
*H01M 10/0587* (2010.01)
*H01M 50/411* (2021.01)

(52) U.S. Cl.
CPC .. *H01M 50/411* (2021.01); *H01M 2300/0082* (2013.01); *H01M 2300/0085* (2013.01)

(56) References Cited

OTHER PUBLICATIONS

Lee, A., et al., Novel polysilsesquioxane hybrid polymer electrolytes for lithium ion batteries, J. Mater. Chem. A, 2014, vol. 2, pp. 1277-1283.

* cited by examiner

GEL ELECTROLYTES AND THE MANUFACTURE THEREOF

CROSS REFERENCE TO RELATED APPLICATIONS

This application claims priority to U.S. Provisional Application No. 62/506,980, filed on May 16, 2017, the disclosure of which is hereby incorporated by reference.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In many lithium batteries, lithium ions generally move from the negative electrode to the positive electrode during discharge and vice versa when charging. In the as-fabricated and discharged state, lithium ion batteries often comprise a lithium compound (such as a lithium metal oxide) at the cathode (positive electrode) and another material, generally carbon, at the anode (negative electrode).

The commercial importance of battery safety has recently become critically clear in the wake of many recent lithium ion battery fires and explosions. Commercial airline carriers, shippers, and others have taken to prohibiting the transport of certain lithium ion batteries and consumer electronics devices using lithium ion batteries. As year-over-year lithium ion battery capacity improvements have failed to keep up with demand, many battery companies have become aggressive in their attempts to improve capacity, sometimes at the expense of safety. For example, according to the New York Times, Samsung's recent difficulties with their consumer electronic lithium ion batteries have resulted from design flaws because of their "aggressive design decisions, which made problems more likely." In particular, "[i]n the Note 7, Samsung opted for an exceptionally thin separator in its battery" in order to increase active material loading in the battery and, thereby, increase battery capacity. Because of the extremely thin nature of the separator, a much greater likelihood of failure was likely "if it breaks down, varies in thickness or is damaged by outside pressure."

SUMMARY OF THE INVENTION

Provided in various embodiments herein are electrolytes, electrolyte and separator systems, and the like, having improved performance characteristics, as well as processes and materials for manufacturing the same. In some embodiments, electrolytes and electrolyte systems provided herein have good or improved mechanical performance characteristics (e.g., decreases failure rate during compression and/or overheating), reduced leakage (e.g., reduced leakage potential when electrolyte is a semi-solid system versus liquid system), rate capabilities (e.g., increases rate of charging, such as versus other solid state systems), safety profiles (e.g., good thermal stability, reduced fail rate, enhanced physical barrier between electrodes, reduced leakage potential, etc.), and other features, such as relative to commercial materials. In certain instances, electrolyte and/or separator systems provided herein achieve such characteristics while also being thinner than typical commercial separator/electrolyte systems (e.g., <25 micron, or thinner).

In certain embodiments, provided herein are electrolytes, electrolyte systems, and precursors thereof. In some embodiments, separator systems provided herein comprise an electrolyte (e.g., semi-solid or gel electrolyte) and a membrane (e.g., separator). In certain embodiments, an electrolyte or electrolyte system provided herein comprises a solid matrix (e.g., of a ceramic, such as a functionalized ceramic) and a liquid electrolyte (e.g., an ionic liquid), such as wherein solid matrix is a porous matrix comprising the liquid electrolyte configured within the porous matrix (e.g., such as forming a semi-solid or gel).

In some embodiments, the ceramic is a functionalized ceramic, such as an organo-functionalized ceramic. In certain embodiments, a functionalized ceramic herein is a compound having a one dimensional ceramic structure, which is functionalized in one or more direction thereof. In certain instances, a functionalized ceramic within the meaning of the instant disclosure is a polymer derived ceramic (PDC) precursor or a partially cured polymer derived ceramic (PDC) precursor. In specific embodiments, the ceramic is a polymer derived ceramic (PDC) or precursor thereof (e.g., a polysilazane, a polysilylcarbodiimide, a polysilsesquioxane, poly(organosiloxane), poly(organosilazane), a poly(organo silylcarbodiimide), a poly(organosilsesquioxane), or a poly(organosiloxane) derived ceramic). In certain embodiments, the functionalized ceramic comprises a partially condensed ceramic group (e.g., as in a polymer derived ceramic precursor), and functionalized groups (e.g., organic groups) that are not or are not fully cured or condensed (e.g., into a three-dimensional ceramic structure). In some embodiments, the ceramic is a cross-linkable ceramic, such as a cross-linkable polymer derived ceramic or precursor thereof and the ceramic is a cross-linked (e.g., functionalized) ceramic. In specific embodiments, the organic component of the functionalized ceramic, comprises a cross-linkable functional group, such as carbon-carbon unsaturation, an epoxide, or the like. In preferred embodiments, the cross-linkable functional group is an acryloyl, methacryloyl, ethacryloyl, epoxyl, styrenyl, or the like.

In certain embodiments, the cross-linking of the functionalized ceramic facilitates formation of a (e.g., porous and solid) three-dimensional network, within which a liquid electrolyte can be or is configured, e.g., the three-dimensional network and the liquid electrolyte collectively forming a semi-solid or gel material. In certain instances, such a configuration facilitates good safety performance parameters due to the good physical barrier between electrolytes and/or the good retention of electrolyte within the system (e.g., less likely to leak relative to liquid systems). In some instances, the good safety profile with good performance characteristics facilitates the safe use lithium metal as an electrode material, as the solid electrolyte system provides an effective barrier at hindering or preventing lithium metal dendrite growth (which, if unchecked, can grow until reaching the counter-electrode material, short-circuiting the system).

In some embodiments, provided herein is a semi-solid electrolyte system comprising a (e.g., functionalized) ceramic (e.g., a polysilsesquioxane), and a liquid electrolyte. In specific embodiments, the (e.g., functionalized) ceramic (e.g., a polysilsesquioxane) is at least partially cross-linked to form a (e.g., continuous) three-dimensional (e.g., solid) matrix. In more specific embodiments, the liquid electrolyte is configured within the three-dimensional (e.g., solid) matrix (e.g., thereby collectively forming a semi-solid or a gel).

In certain embodiments, also provided herein is a separator system comprising a semi-solid (e.g., gel) electrolyte and a membrane. In some embodiments, the membrane is a porous membrane, such as comprising a polymer and/or a polymer-ceramic hybrid or composite structure, such as described herein. In some embodiments, the porous membrane is a nanofiber mat or a porous thin film. In preferred embodiments, the porous membrane comprises a polymer matrix material at least partially coated with a ceramic. In more preferred embodiments, the polymer matrix material further comprises ceramic embedded therein.

Also provided in various embodiments herein are compounds suitable for use in semi-solid and gel electrolyte and separator systems, such as described herein. In particular, provided herein are poly(organosiloxane), poly(organosilazane), poly(organo silylcarbodiimide), poly(organosilsesquioxane), poly(organosiloxane) compounds comprising a cross-linkable group, such as described herein. Similarly, provided herein are such compounds that are at least partially cross-linked, as well as precursors thereof. Specific details of non-limiting exemplary compounds are described herein.

Further, provided herein is a process for preparing an electrolyte system, a separator system, or battery (e.g., lithium battery, such as a lithium ion or lithium sulfur battery). In specific embodiments, the process comprises:
a. providing a separator membrane;
b. providing a liquid electrolyte to the separator membrane;
c. providing a (e.g., functionalized) ceramic (e.g., cross-linkable poly(organosiloxane), poly(organosilazane), poly(organo silylcarbodiimide), poly(organosilsesquioxane), poly(organosiloxane)) to the separator membrane; and
d. cross-linking the (e.g., functionalized) ceramic.

In specific embodiments, the process further comprises providing at least one electrode and configuring the separator in proximity to the at least one electrode. In more specific embodiments, the process comprises providing a first and a second electrode and configuring the separator in proximity to both the first and second electrodes (e.g., configuring the separator between the first and second electrodes). In some embodiments, the (e.g., cross-linkable organo-polymer derived) ceramic (e.g., and the liquid electrolyte) is provided to the separator membrane following bringing the separator in proximity to the at least one electrode. In specific embodiments, crosslinking of the functionalized ceramic is performed following bringing the membrane in proximity to the at least one electrode and functionalized ceramic to the membrane. In some instances, such a process facilitates providing a semi-solid electrolyte system in direct contact with the electrode material. In specific instances, such contact facilitates good performance characteristics while also providing good safety characteristics. In particular instances, such as wherein a lithium metal electrode is utilized, formation of the semi-solid electrolyte system and/or separator system in contact with the electrode facilitates retardation and/or prevention of the formation of lithium dendrites on the surface of the lithium metal containing electrode.

In specific embodiments, a process of preparing a semi-solid electrolyte system herein comprises:
a. providing a first electrode;
b. providing a separator membrane;
c. configuring the separator membrane in proximity to the first electrode to form a layered assembly;
d. charging the layered assembly with (i) a liquid electrolyte; and (ii) a (crosslinkable) polysilsesquioxane; and e. crosslinking the polysilsesquioaxane to form a semi-solid electrolyte system (e.g., comprising crosslinked-polysilsesquioxane three dimensional matrix, the liquid electrolyte configured within the three dimensional matrix).

In specific embodiments, provided herein are gel (e.g., ionogel) electrolytes based on functionalized ladder-like polysilsesquioxane (LPSQ) or polyhedral oligomeric polysilsesquioxane (PSSQ). In certain instances, these functionalized silsesquioxane ionogel electrolytes exhibit great ionic conductivity (~90% of liquid electrolyte) and superior rate capability. In some instances, use of gel electrolyte in (e.g., in Li—S batteries) can reduce the electrolyte volume and eliminate the issues of leaking and shuttle effect especially for pouch cells.

In certain embodiments, electrolyte systems provide herein utilize (e.g., conventional) liquid electrolyte (e.g., such as used in lithium ion or lithium-sulfur batteries), with the addition of ceramic additives functionalized with cross-linkable and highly ionic conducting chains. In certain instances, cross-linking of the cross-linkable functionalities provides a gelled electrolyte system. In some instances, a cell assembly is performed using conventional procedures, with the addition of a gelling (or cross-linking) step following assembly. In some instances, existing infrastructure can be utilized to manufacture such batteries, without the need for extensive capital investment and additional footprints to switch manufacturing to such systems. Any suitable gelling (or crosslinking) step is utilized, such as by photo-initiation (e.g., ultraviolet (UV) light), chemical initiation (e.g., AIBN), or the like. As discussed herein, such batteries comprising a semi-solid or gel electrolyte system described herein facilitates suppression/removal of dendritic growth of lithium metal, prevention of electrolyte leakage, high thermal and dimensional stability, and other benefits.

In some embodiments, an organo-functionalized compound described herein comprises one or more organic functional group, such as in the place of another group of the compound (e.g., in the place of a hydrogen group). Exemplary organo-functionalized compounds include those illustrated herein wherein an R group thereof comprises an organic radical or group. Organic radicals and groups include hydrocarbon based radicals and groups that are optionally functionalized (e.g., wherein one or more carbon and/or hydrogen of the hydrocarbon is optionally substituted) with various heteroatoms, such as halides, non-metals (e.g., oxygen, nitrogen, sulfur, and/or the like), metalloids (e.g., silicon), and the like. In various instances, organic radicals comprise at least one of the following: one or more alkyl, one or more heteroalkyl, one or more aryl, and/or one or more heteroaryl. Alkyl and heteroalkyl radicals and groups optionally comprises cyclic and acyclic radicals or groups, optionally comprise branched and straight chain radicals or groups, optionally comprise saturated and unsaturated radicals or groups. A heteroalkyl group is an alkyl group wherein at least one carbon is replaced with a heteroatom (e.g., non-metal or halide), such as oxygen, sulfur, nitrogen, or the like. For example, in a heteroalkyl group, a —$CR_2$— group may be substituted with an —O— group, an —S— group, an —SO— group, an —$SO_2$— group, or an —NR— group. Similarly, a heteroaryl group is an aryl group wherein at comprising at least one heteroatom within an aromatic ring structure. Alkyl, heteroalkyl, aryl, and heteroaryl groups are optionally substituted or unsubstituted. For example, optionally substituted groups have one or more atoms (e.g., hydrogen atoms) that are covalently bound to a group or substituent as defined above, or a free electron pair, such as on a nitrogen, may be replaced by a covalently-bound non-hydrogen substituent, such as selected from the group consisting of R, OH, SH, OR, SR, S(=O)R, SO$_2$R, halo, NR$_2$, NR$_3$+, NRCOR, NO$_2$, CN, CO$_2$R, CONR$_2$, COR, oxo (=O), and thioxo (=S). In the above substituents, each R is independently selected from H, alkyl (e.g., lower alkyl), heteroalkyl (e.g., lower heteroalkyl), aryl, heteroaryl, or the like. In addition, groups, such as "alk" and "alkyl" groups, offset in parentheticals, are optionally present or not present. For example, in "(alk)acryloxyalkyl," both or either of "alkacryloxyalkyl" and/or "acryloxyalkyl" are contemplated. Moreover, "alk" groups are "alkyl" groups are described herein.

These and other objects, features, and characteristics of the system and/or process disclosed herein, as well as the processes of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" includes one and only one and plural referents unless the context clearly dictates otherwise. In addition, unless otherwise stated, values and characteristics described for individual components herein also include disclosure of such values and characteristics as an average of a plurality (i.e., more than one) of such components. Similarly, disclosure of average values and characteristics herein also includes a disclosure of an individual value and characteristic as applied to a single component herein.

In certain instances, a value "about" an indicated value is a value suitable for achieving a suitable result and/or a result similar as achieved using the identified value. In some instances, a value "about" an indicated value is between ½ and 2 times the indicated value. In certain instances, a value "about" an indicated value is ±50% the indicated value, ±25% the indicated value, ±20% the indicated value, ±10% the indicated value, ±5% the indicated value, ±3% the indicated value, or the like.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Figure 1:
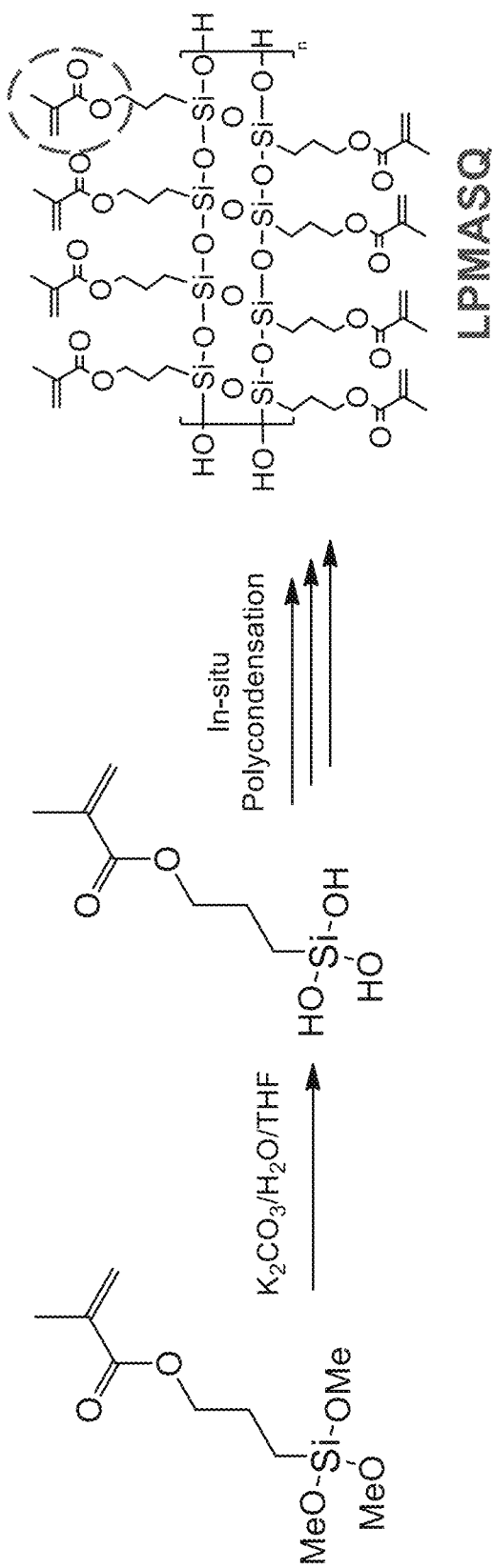
FIG. 1 illustrates a schematic of an exemplary synthesis of an exemplary LPMASQ.

Provided in certain embodiments herein are electrolytes, semi-solid or gel electrolyte systems, separator systems, and batteries comprising the same. Also provided herein are compounds, such as polymer derived ceramic compounds and precursors thereof. Provided in some instances herein are processes and systems for manufacturing the same.

In certain embodiments, provided herein are electrolytes, electrolyte systems, and precursors thereof. In some embodiments, separator systems provided herein comprise an electrolyte (e.g., semi-solid or gel electrolyte) and a membrane (e.g., separator). In certain embodiments, an electrolyte or electrolyte system provided herein comprises a ceramic, a polymer derived ceramic, or a polymer derived ceramic precursor and a liquid electrolyte (e.g., an ionic liquid). In some instances, the ceramic or polymer derived ceramic (or precursor thereof) forms a porous matrix comprising the liquid electrolyte configured within the porous matrix (e.g., such as forming a semi-solid or gel).

In some embodiments, the ceramic is a functionalized ceramic, such as an organo-functionalized ceramic. In specific embodiments, the ceramic is a polymer derived ceramic (PDC) (e.g., a polysilazane, a polysilylcarbodiimide, a polysilsesquioxane, poly(organosiloxane), poly(organosilazane), a poly(organo silylcarbodiimide), a poly(organosilsesquioxane), or a poly(organosiloxane) derived ceramic), or precursor thereof. In preferred embodiments, the polymer derived ceramic (PDC) or precursor thereof is cross-linkable and the ceramic is a cross-linked ceramic.

In specific embodiments, the organic component of a functionalized ceramic provided herein, or precursor thereof, comprises a cross-linkable functional group, such as carbon-carbon unsaturation, an epoxide, or the like. In preferred embodiments, the cross-linkable functional group is an acryloyl, methacryloyl, ethacryloyl, epoxyl, styrenyl, or the like.

In specific embodiments, the electrolyte system comprises a liquid electrolyte and a polysilsesquioxane (e.g., a poly(organosilsesquioxane)), or a ceramic derived therefrom. In more specific embodiments, the polysilsesquioxane is a ladder-like polysilsesquioxane (LPSQ) or a polyhedral oligomeric polysilsesquioxane (PSSQ). In specific embodiments, the polysilsesquioxane is functionalized by one or more cross-linked and/or cross-linkable functional groups. Depending on whether or not the electrolyte has been "gelled," the crosslinked and/or cross-linkable functional groups may be cross-linked or not. In some instances, once cross-linked and in the gelled state, a plurality of the cross-linkable groups are cross-linked. Any suitable cross-linkable group is optionally utilized, such as a (cross-linked) alkylene (C=C) or epoxide group.

In certain embodiments, a functionalized ceramic (e.g., polysilsesquioxane) provided herein comprises one or more of the following (cross-linkable) groups: acryloylalkyl, methacryloylalkyl, ethacryloylalkyl, acryloylheteroalkyl, methacryloylalkyl, or ethacryloylalkyl, or any combination thereof. In certain embodiments, a precursor system provided herein comprises such groups in an unreacted form. In some embodiments, a semi-solid electrolyte system provided herein comprises such groups (all or in part) in a polymerized form (e.g., which provides a cross-linked polymer derived ceramic).

In some embodiments, the functionalized ceramic utilized herein is functionalized with a ionically conducting group. In specific embodiments, the (e.g., functionalized) ceramic or polymer derived ceramic (or precursor thereof) is functionalized with (i) a cross-linkable group, and (ii) an ionically conducting group. In some embodiments, the ionically conductive group is any suitable group, such as a group having an ionic conductivity of at least $10^{-6}$ S/cm. In specific embodiments, the group has an ionic conductivity of at least $10^{-5}$ S/cm. In more specific embodiments, the group has an ionic conductivity of at least $5 \times 10^{-5}$ S/cm. In still more specific embodiments, the group has an ionic conductivity of at least $10^{-4}$ S/cm.

In specific embodiments, an ionically conducting group provided herein comprises a heteroalkyl group and/or a heteroaryl group. In specific embodiments, the heteroalkyl group comprises at least one oxygen (e.g., more than one oxygen group). In more specific embodiments, the heteroalkyl group is a poly(oxoalkylene) group. In more specific embodiments, the poly(oxoalkylene) is polyethylene oxide (PEG, PEO), polyoxomethylene, polypropylene oxide, poloxamer, or the like.

In specific embodiments, a ceramic or polymer derived ceramic (or precursor thereof) provided herein is functionalized with a polyoxoalkylene and an (alk)acryloxyalkyl (i.e., an alkacryloxyalkyl or an acryloxyalkyl). In more specific embodiments, the ceramic or polymer derived ceramic (or precursor thereof) is a poly(polyoxoalkylene-co-(alk)acryloxyalkyl) silsesquioxane. In still more specific embodiments, the ceramic or polymer derived ceramic (or precursor thereof) is a ladder-like poly(polyoxoalkylene-co-(alk)acryloxyalkyl) silsesquioxane. In some embodiments, the ceramic or polymer derived ceramic (or precursor thereof) is a poly(polyethyleneoxide-co-methacryloxypropyl) silsesquioxane, such as a ladder-like poly(polyethyleneoxide-co-methacryloxypropyl) silsesquioxane (LPEO-MASQ).

In various embodiments, ceramics or polymer derived ceramics (or precursors thereof) comprise any number of suitable functional groups. For example, such materials comprise, in some instances, sufficient cross-linkable or cross-linked groups suitable for forming a matrix sufficient to "gel" or form a semi-solid with the liquid electrolyte with which it is combined. Similarly, in some instances, such materials comprise sufficient ionically conducting groups in order to provide an adequate and/or desired ionic conductivity of the electrolyte and/or separator systems.

In certain embodiments, the number ratio of cross-linked or cross-linkable functional groups to functional groups with high ionic conductivity is about 1:99 to about 99:1. In more specific embodiments, the number ratio is about 2:98 to about 98:2. In still more specific embodiments, the number ratio is about 1:20 to about 20:1. In yet more specific embodiments, the number ratio of cross-linked or cross-linkable functional groups to functional groups with high ionic conductivity is about 1:10 to about 10:1. In still more specific embodiments, the number ratio is about 1:5 to about 5:1. In specific embodiments, the number ratio is about 1:3 to about 3:1. In more specific embodiments, the number ratio is about 1:2 to about 2:1 such as about 1:1.

In certain embodiments, the cross-linking of the functionalized ceramic (e.g., polymer derived ceramic) facilitates formation of a (e.g., porous and solid) three-dimensional network, within which a liquid electrolyte can be configured, e.g., the three-dimensional network and the liquid electrolyte collectively forming a semi-solid or gel material. In certain instances, such a configuration facilitates good safety performance parameters due to the good physical barrier between electrolytes and/or the good retention of electrolyte within the system (e.g., less likely to leak relative to liquid systems). In some instances, the good safety profile with good performance characteristics facilitates the safe use lithium metal as an electrode material, as the solid electrolyte system provides an effective barrier at hindering or preventing lithium metal dendrite growth (which, if unchecked, can grow until reaching the counter-electrode material, short-circuiting the system).

In some embodiments, provided herein is a semi-solid electrolyte system comprising a polymer derived ceramic (e.g., a polysilsesquioxane), and a liquid electrolyte. In specific embodiments, the polymer derived ceramic (e.g., a polysilsesquioxane) is at least partially cross-linked to form a (e.g., continuous) three-dimensional (e.g., solid) matrix. In more specific embodiments, the liquid electrolyte is configured within the three-dimensional (e.g., solid) matrix (e.g., thereby collectively forming a semi-solid or a gel).

Also provided in various embodiments herein are compounds suitable for use in semi-solid and gel electrolyte and separator systems, such as described herein. In particular, provided herein are poly(organosiloxane), poly(organosilazane), poly(organo silylcarbodiimide), poly(organosilsesquioxane), poly(organosiloxane) compounds comprising a cross-linkable group, such as described herein. Similarly, provided herein are such compounds that are at least partially cross-linked, as well as precursors thereof.

In certain embodiments, provided herein is a compound (e.g., polysilsesquioxane), ceramic or ceramic precursor thereof represented by the following formula:

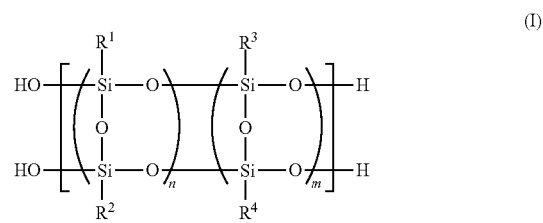

(I)

Figure 6:
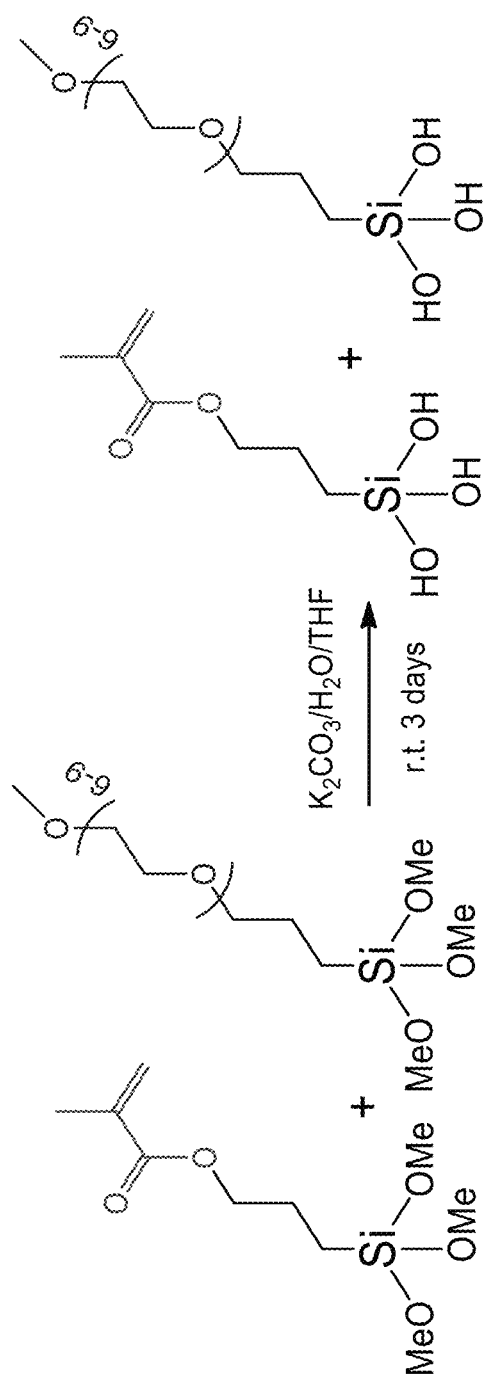
FIG. 6 illustrates a schematic of an exemplary synthesis of an exemplary LPMASQ co-polymer.
Figure 6:
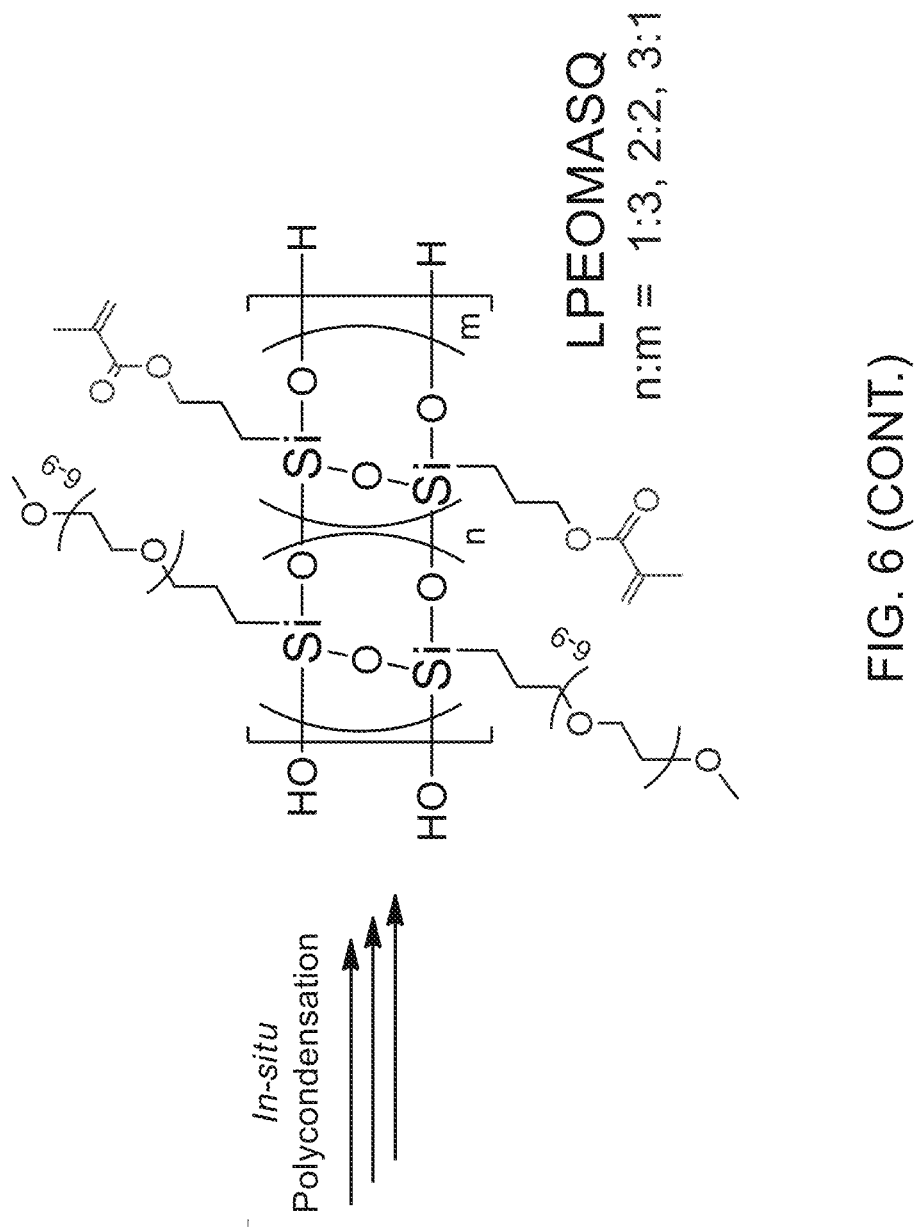

In certain embodiments, R1 and/or R2 is an ionically conducting group. In some embodiments, R1 and R2 are independently selected from H, alkyl, heteroalkyl, alkylaryl, heteroalkylaryl, alkylheteroaryl, heteroalkylheteroaryl, alkylarylalkyl, heteroalkylarylalkyl, alkylheteroarylalkyl, and heteroalkylheteroarylalkyl. In specific embodiments, R1 and R2 are independently selected from H, alkyl, and heteroalkyl. In more specific embodiments, at least one of R1 and/or R2 is a heteroalkyl. In more specific embodiments, both R1 and R2 are heteroalkyl. In certain embodiments, R1 and/or R2 are heteroalkyl comprising at least one oxygen (e.g., more than one oxygen). In specific embodiments, the heteroalkyl comprising at least one oxygen is a poly(oxoalkylene) (e.g., polyethylene oxide (used interchangeably herein with polyethylene glycol (PEG)), polyoxomethylene, polypropylene oxide, poloxamer, or the like. In some embodiments, each heteroalkyl is independently selected from polyethylene oxide, polyoxomethylene, polypropylene oxide, poloxamer, and the like. In specific embodiments, the heteroalkyl is or comprises a polyethylene oxide group with about 5-11 (e.g., 6-9 or 7-10) polyethylene oxide repeat groups (such as illustrated in FIG. 6). In various embodiments, R1 and/or R2 group independently substituted or not substituted. In some embodiments, the R1 and/or R2 group is substituted with oxo, alkoxy, or a combination thereof.

In general, while formula (I) is illustrated as a block polymer, wherein monomeric units comprising R1 and R2 are configured together in a block and monomeric units comprising R3 and R4 are configured together in a block, formula (I) also covers random co-polymers wherein such monomeric units are configured in any arrangement, unless otherwise stated. Disclosure of other formulas herein similarly identified include both block co-polymers and random co-polymers of any monomeric residues set forth.

In certain embodiments, compounds of formula (I) optionally have mixed functional groups, such as wherein the functional groups of R2 are as described for R3 or R4 herein and/or the functional groups of R3 are as described for R1 or R2 herein. In some such embodiments, the ratio of R1 and R2 functional groups to R3 and R4 functional groups is as described for the ratios of n:m herein. Similarly, in certain embodiments, provided herein is a compound (e.g., ladder polysilsesquioxane, such as illustrated in formula (I)) having the formula $[(Si_2O_3R^1R^2)_n—(Si_2O_3R^3R^4)_m—(Si_2O_3R^1R^3)_p]$, wherein n, m, and p are integers, and p are integers, wherein the total is about 10 to about 10,000, or any integer value described herein for ladder polysilsesquioxane repeat units. In specific embodiments, the ratio of the sum of R1 and R2 groups to the sum of R3 and R4 groups is as described herein for the ratio of n:m (e.g., 1:99 to 99:1, 2:98 to 98:2, 1:20 to 20:1, 1:10 to 10:1, 1:4 to 4:1, 1:3 to 3:1, or the like).

Figure 8:
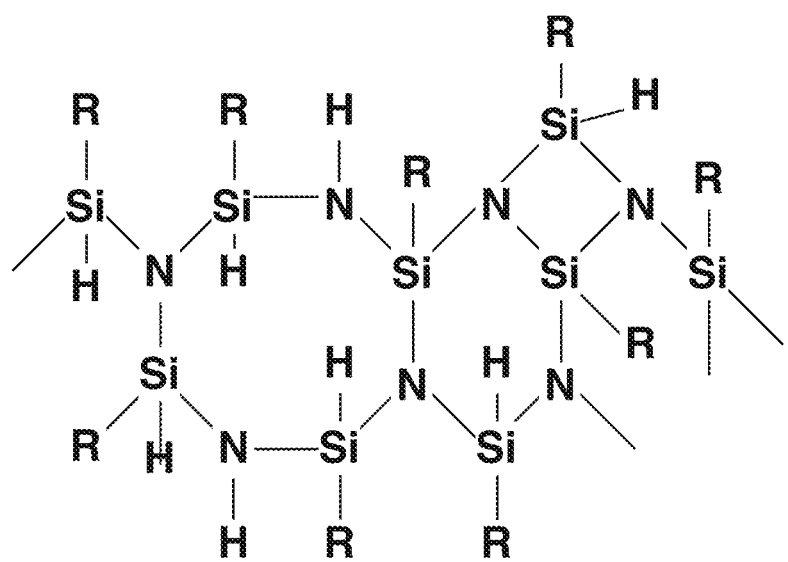
FIG. 8 illustrates an exemplary polysilazane comprising various straight chain and ring structured Si groups, as well as various functional groups.
Figure 9:
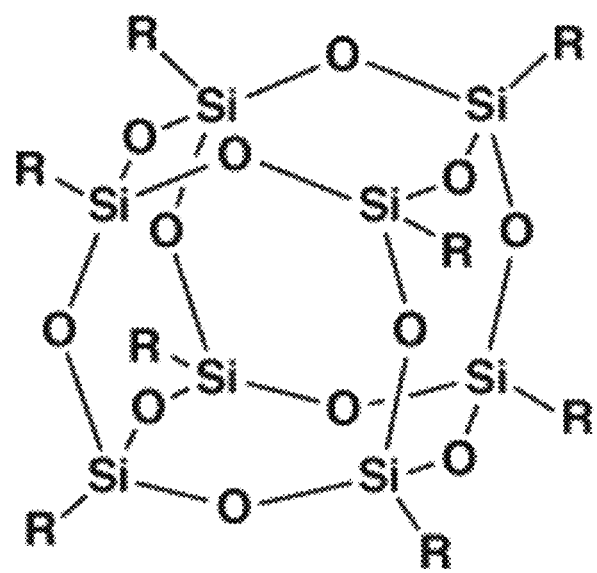
FIG. 9 illustrates an exemplary silsesquioxane cage structure.
Figure 10:
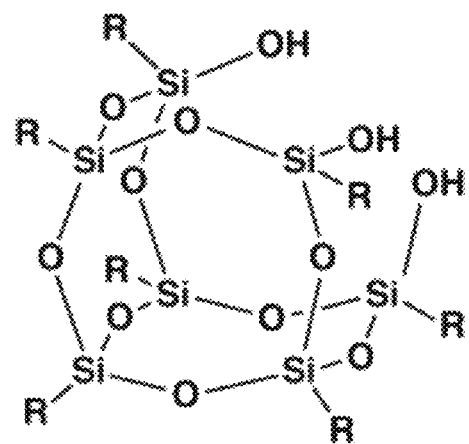
FIG. 10 illustrates an exemplary silsesquioxane opened cage structure.

Similarly, provided herein are compounds herein of any one of FIGS. 8-10, wherein at least one R (or H) group thereof is as described for an R1 or R2 group herein.

In some embodiments, each R3 and R4 are independently selected from H, alkyl, heteroalkyl, alkylaryl, alkylarylalkyl, heteroalkylaryl, and heteroalkylarylalkyl. In certain embodiments, R3 and/or R4 groups are independently substituted. In specific embodiments, one or more R3 and/or R4 group is optionally substituted by oxo, alkoxy, alkyl, or a combination thereof. In certain embodiments, some or all R3 and/or R4 comprise a cross-linkable group, such as an unsaturated carbon-carbon bond. In specific embodiments, each or some R3 (and/or R4) is alkyl, heteroalkyl, alkylaryl, alkylarylalkyl, heteroalkylaryl, or heteroalkylarylalkyl; is optionally substituted by oxo, alkoxy, or a combination thereof; and comprises at least one point of (non-aryl) carbon-carbon unsaturation (e.g., at least one non-aryl carbon-carbon double bond). In some instances, R3 (and/or R4) terminates (i.e., distal to the polysilsesquioxane ladder backbone) in an unsaturated carbon-carbon bond. In specific embodiments, at least one of R3 and/or R4 is an oxo substituted heteroalkyl comprising terminal carbon-carbon unsaturation, such as (alk)acryloxyalkyl). In specific embodiments, R3 and/or R4 is methacryloxyalkyl, such as wherein the alkyl is a lower (e.g., C1-C6) alkyl. In more specific embodiments, R3 and/or R4 is methacryloxypropyl.

In certain embodiments, an R3 and/or R4 group provided herein is cross-linked with at least one other R3 or R4 group of the compound or a cross-linkable or polymerizable group of another compound (e.g., another compound represented by a formula described herein, such as the same formula). In some instances, the R3 or R4 group of at least one monomeric residue of the compound is cross-linked with at least one R3 or R4 group of another monomeric residue of the compound.

Similarly, provided herein are compounds herein of any one of FIGS. 8-10, wherein at least one R (or H) group thereof is as described for an R3 or R4 group herein.

In various embodiments, m and n are any suitable integer. In some instances, m and n are independently 1-10,000, such as 10-1,000. In certain embodiments, the sum of n and m is about 10 to about 10,000. In certain embodiments, the ratio of n to m is about 1:99 to about 99:1. In specific embodiments, the ratio is about 2:98 to about 98:2. In more specific embodiments, the ratio is about 1:20 to about 20:1. In still more specific embodiments, the ratio is about 1:10 to about 10:1. In yet more specific embodiments, the ratio is about 1:5 to about 5:1, such as about 1:4 to about 4:1 or about 1:3 to about 3:1. In some embodiments, the ratio is about 1:2 to about 2:1, such as about 1:1.

Similarly, provided herein are compounds herein of any one of FIGS. 8-10, wherein the R (or H) group(s) corresponding to R1/R2 and the R group(s) corresponding to R3/R4 are present in similar ratios as described for n and m above.

In specific embodiments, R3 and/or R4 is L-CR$^5$=R$^5$$_2$, wherein each R5 is independently alkyl (e.g., lower alkyl, such as C1-C3 alkyl) or H. In specific embodiments, a compound provided herein is represented by the following formula:

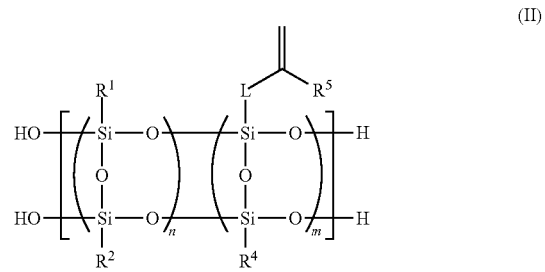

(II)

In certain embodiments, L is absent, alkyl, heteroalkyl, alkylaryl, alkylarylalkyl, heteroalkylaryl, or heteroalkylarylalkyl. L is optionally substituted or not substituted. In specific embodiments, L is optionally substituted by alkyl, oxo, alkoxy, or a combination thereof.

Also provided in certain embodiments herein are compounds represented by the following formula:

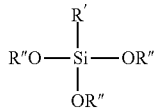
(III)

In certain embodiments, R' is as described for any one of R1-R4 herein. In specific embodiments, heteroalkyl, alkylaryl, alkylarylalkyl, heteroalkylaryl, or heteroalkylarylalkyl. In various embodiments, R' is substituted or not substituted. In specific embodiments, R' is optionally substituted with oxy, alkoxy, alkyl, or a combination thereof. In certain embodiments, each R" is H or alkyl, such as lower alkyl (e.g., C1-C6 or C1-C3 alkyl).

In certain embodiments, compounds of formula (III) are utilized to synthesize ladder-like polysilsesquioxane (LPSQ) and/or a polyhedral oligomeric polysilsesquioxane (PSSQ), such as illustrated in formula (I) and/or (II). Exemplary processes are described in FIG. 1 and FIG. 6 herein.

Alternative ceramics or polymer derived ceramic precursors used in electrolytes, electrolyte systems, separator systems, and the like provided herein are polysilazanes or based on polysilazanes, such as having a structure of general formula (IV):

(IV)

In some instances, the polysilazane has a chain, cyclic, crosslinked structure, or a mixture thereof. FIG. 8 illustrates an exemplary silazane structure having a plurality of units of Formula IV with cyclic and chain structures. In various embodiments, the polysilane comprises any suitable number of units, such as 2 to 10,000 units and/or n is any suitable value, such as an integer between 2 and 10,000. In certain embodiments, the polysilazane of formula IV has an n value such that the 100 to 100,000, such as from 300 to 10,000. Additional units are optionally present where each $R^6$ or $R^7$ is optionally cross-linked to another unit at the N group— e.g., forming, together with the $R^8$ of another unit a bond— such cross-links optionally form links between separate linear chains, or form cyclic structures, or a mixture thereof. In an exemplary embodiment, a polysilazane comprises a first number (n) of the repeat units set forth in formula IV (e.g., —[SiR$^6$R$^7$—NR$^8$]$_n$—) and a second number (m) of the repeat units set forth in formula IV (e.g., —[SiR$^{6'}$R$^{7'}$T-NR$^{8'}$]$_m$—), wherein the first and second repeat units are different. In specific embodiments, the ratio of the first structure to the second structure is 1:99 to 99:1, or have another ratio of n to m as described herein for formula (I). Further, in certain embodiments, a polysilazane optionally comprises a plurality of units having a third structure (e.g., —[SiR$^{6''}$R$^{7''}$—NR$^{8''}$]$_q$—), such as wherein the ratio of the first structure to the third structure is 1:99 to 99:1, or have another ratio of n to m as described herein for formula (I). In specific embodiments, n, m, and q are integers. The various first, second, and optional third structures may be ordered in blocks, in some other ordered sequence, or randomly. In specific embodiments, each $R^6$, $R^7$, $R^8$, $R^{6'}$, $R^{7'}$, $R^{8'}$, $R^{6''}$, $R^{7''}$, $R^{8''}$ is independently selected from any group described for R1-R5, or are optionally absent, such as when internally cross-linked (e.g., as illustrated by the exemplary structure of FIG. 8). In particular, at least one of $R^6$, $R^7$, $R^8$ is as described for R1 or R2 above, and at least one of $R^{6'}$, $R^{7'}$, $R^{8'}$ is as described for R3 or R4 above. In specific embodiments, R6 is (e.g., independently) as described for R1 and R7 is (e.g., independently) as described for R2, and R8 is (e.g., independently) H or alkyl. In some embodiments, each R6' is (e.g., independently) as described for R3, each R7' is (e.g., independently) as described for R4 and R8' is (e.g., independently) H or alkyl.

In some embodiments, ceramics or polymer derived ceramic precursors used in electrolytes, electrolyte systems, separator systems, and the like provided herein are polysilsesquioxanes, such as having a structure of general formula (II):

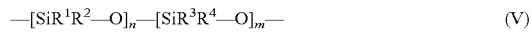
(V)

In some instances, the compound is a silsesquioxane having a cage (e.g., polyhedral oligomeric) or opened cage (e.g., wherein an SiR$^1$ is removed from the cage) structure. FIG. 9 illustrates an exemplary cage wherein n+m is 8 (wherein the R groups of FIG. 9 is defined by R1 or R2 and R3 or R4 herein). FIG. 10 illustrates an exemplary opened cage wherein n+m is 7 (wherein the R group of FIG. 10 is defined by R1 or R2 and R3 or R4 herein). In some instances, an $R^1$, $R^2$, $R^3$ or $R^4$ group of one unit is taken together with an $R^1$, $R^2$, $R^3$ or $R^4$ group of another unit to form an —O—. In certain embodiments, a cage structure is optionally formed when several an $R^1$, $R^2$, $R^3$ or $R^4$ groups are taken together with the $R^1$, $R^2$, $R^3$ or $R^4$ groups of other units (e.g., as illustrated in FIG. 9). In various embodiments, the polysilazane comprises any suitable number of units, such as 2 to 20 units and/or n+m is any suitable value, such as an integer between 2 and 20, e.g., 7-16. In certain embodiments, the cage comprises 8 units, but larger cages are optional. In additional, opened cages, wherein one of the units is absent are also optional.

In certain embodiments, a liquid electrolyte utilized in any gel, semi-solid, or system provided herein is any suitable liquid electrolyte. In preferred embodiments, the liquid electrolyte comprises an ionic liquid. In some specific embodiments, the liquid electrolyte is or comprises an N-alkyl-N-alkylpyrrolidinium bis(fluoro(alkyl)sulfonyl)imide. In certain embodiments, the N-alkyl-N-alkylpyrrolidinium bis(fluoro(alkyl)sulfonyl)imide is N-butyl-N-methylpyrrolidinium bis(trifluoromethylsulfonyl)imide (BMPTFSI), N-methyl-N-propylpyrrolidinium bis(trifluoromethylsulfonyl)imide, N-methyl-N-propylpyrrolidinium bis(fluorosulfonyl)imide, or a combination thereof. In certain embodiments, the liquid electrolyte further comprises a lithium bis(fluoro(alkyl)sulfonyl)imide, such as lithium bis(trifluoromethylsulfonyl)imide (LiTFSI).

In certain embodiments, also provided herein is a separator system comprising a semi-solid (e.g., gel) electrolyte and a membrane. In some embodiments, the membrane is a porous membrane, such as comprising a polymer and/or a polymer-ceramic hybrid or composite structure, such as described herein. In some embodiments, the porous membrane is a nanofiber mat or a porous thin film. In certain embodiments, the membrane is a polymer-ceramic hybrid. In preferred embodiments, the porous membrane comprises a polymer matrix material at least partially coated with a ceramic. In more preferred embodiments, the polymer matrix material further comprises ceramic embedded therein.

In specific embodiments, provided herein is a semi-solid electrolyte comprising (i) a polysilsesquioxane, and (ii) a liquid electrolyte, the polysilsesquioxane being at least partially crosslinked to form a three-dimensional matrix, the liquid electrolyte being configured within the three-dimensional (e.g., solid) matrix; and a porous membrane, the semi-solid electrolyte being configured within the three-dimensional matrix.

In certain embodiments, the separator system is a battery separator system. In specific embodiments, the separator system is a lithium battery separator system. In still more specific embodiments, the separator system is a lithium ion or lithium sulfur battery separator system.

In some embodiments, the membrane is a porous membrane. In specific embodiments, the porous membrane is or comprises a porous film (e.g., comprising a porous, two-dimensional material) or a porous fiber mat (e.g., comprising a non-woven mat of one-dimensional materials that collectively form a porous material).

In certain embodiments, the membrane is a porous film. In some embodiments, the porous thin film comprises a porous polymer film (e.g., a porous two-dimensional, polymer matrix). In specific embodiments, the porous thin film comprises a porous polymer film with a ceramic coating at least partially covering one or more surface thereof.

In certain embodiments, a porous membrane provided herein comprises a polymer-ceramic hybrid material. In specific embodiments, the polymer ceramic hybrid material comprises a continuous matrix of a polymer and a continuous matrix of a ceramic. In certain embodiments, the hybrid material is a film (e.g., comprising a porous, two-dimensional continuous matrix) or a fiber mat (e.g., comprising a plurality of one dimensional fibers that collectively form a membrane).

In certain embodiments, a separator, membrane, or thin film has a porosity of about 10% to about 70%. In some embodiments, such as with a thin film or separator comprising a thin film is utilized, a lower porosity is utilized, such as about 10% to about 50%, about 10% to about 40%, or about 20% to about 40%. In some instances, the lower porosity provides for a more continuous material, which allows for improved mechanical characteristics (e.g., reducing deformation during use and/or thermal events) and increased physical barrier surface area between the electrodes of a battery (e.g., reducing the failure rate caused by physical interaction between the electrodes). Further, in certain instances, such materials retain good performance characteristics, such as capacities and rate capabilities, despite the low porosity. In certain embodiments, the high-performance characteristics of thin film separators provided herein combined with the low porosity thereof allow for the use of very thin separators, with good safety and performance profiles. In certain instances, provided herein are separators having a thickness of less than 20 micron, such about 5 micron to about 20 micron, or about 5 micron to about 15 micron.

In some embodiments, such as with a fiber mat or separator comprising a fiber mat is utilized, a higher porosity is utilized, such as about 40% to about 70%. In certain embodiments, separators provided herein retain good capacity and rate capabilities while also retaining good mechanical and/or safety characteristics, despite the less continuous morphology of the material. In certain instances, thicker separators are utilized, however, to achieve such results. In some embodiments, fiber mat separators provided herein have a thickness of about 15 micron to about 25 micron, such as about 20 micron.

In various embodiments, a separator, membrane, or thin film has an average thickness of about 25 micron (micrometer, μm) or less, such as about 1 micron to about 25 micron. In specific embodiments, the thickness is about 20 micron or less, such as about 1 micron to about 20 micron. In more specific embodiments, the thickness is about 5 micron to about 15 micron. In still more specific embodiments, the thickness is about 6 micron to about 12 micron. In other embodiments, the thickness is about 15 micron to about 25 micron, such as about 20 micron. In certain embodiments, thinner separators are preferred to allow more active material to be included in a battery, but performance characteristics, particularly safety parameters, should also be considered and/or met.

In certain embodiments, a separator, membrane, or thin film provided herein has a thickness variation of less than 20%. In preferred embodiments, the separator, membrane, or thin film provided herein has a thickness variation of less than 15%. In specific embodiments, the separator, membrane or thin film provided herein has a thickness variation of less than 10%. In more specific embodiments, the separator, membrane or thin film provided herein has a thickness variation of less than 5%.

In certain instances, small pore sizes are desirable to avoid contact between negative and positive active electrode components. In general, such as in separators having a thickness of >20 micron, sub-micron pore sizes are sufficient to avoid contact between the negative and positive electrodes (which could cause short circuit, cell failure, fire, etc.). In certain instances, smaller pore sizes are desired for thinner separators, however, in order to reduce the chances of interaction between the two separators (e.g., due to use/distortion of the battery and separator, thermal distortion of the separator, smaller active electrode materials jutting into the pore—a small protrusion into the pore that may not be problematic with a thicker separator, could be problematic with a thinner separator, etc.).

In some embodiments, a separator, membrane, or thin film has a pore size distribution d95 of (i.e., wherein 95% of the pores, by number, have a size less than) about 1 micron or less. In specific embodiments, a separator, membrane, or thin film has a pore size distribution d98 of about 1 micron or less. In specific embodiments, a separator, membrane, or thin film has a pore size distribution d99 of about 1 micron or less. In more specific embodiments, a separator, membrane, or thin film has a pore size distribution d99.8 of about 1 micron or less. In still more specific embodiments, a separator, membrane, or thin film has a pore size distribution d99.9 of about 1 micron or less.

In certain embodiments, smaller pore sizes are provided in separators and materials, provided herein, such as in the polymer and polymer-ceramic hybrid film separators, particularly in cases wherein the separator/film/membrane is less than 20 micron thick. In some embodiments, a separator, membrane, or thin film has a pore size distribution d95 of about 0.5 micron or less. In specific embodiments, a separator, membrane, or thin film has a pore size distribution d98 of about 0.5 micron or less. In more specific embodiments, a separator, membrane, or thin film has a pore size distribution d99 of about 0.5 micron or less.

In certain embodiments, the separator, membrane, or thin film provided herein is mesoporous, such as having a median (d50) pore size of less than 0.2 micron (200 nm). In specific embodiments, the median (d50) pore size is less than 0.1 micron. In more specific embodiments, the median (d50) pore size is about 30 nm to about 60 nm.

In specific embodiments, provided herein is a porous laminate comprising a porous polymer film and at least one ceramic coating on the surface thereof. In some embodiments, the porous film is at least 20% coated with a ceramic coating. In certain embodiments, the porous film is at least 40% coated with a ceramic coating. In specific embodiments, the porous film is at least 50% coated with the ceramic coating. In more specific embodiments, the porous film is at least 60% coated with the ceramic coating. In still more specific embodiments, the porous film is at least 80% coated with the ceramic coating. In yet more specific embodiments, the porous film is at least 90% coated with the ceramic coating.

In some embodiments, the porous polymer film has a first and second surface, at least 20% of either the first and/or second coating being coated with one or more ceramic coating. In certain embodiments, at least 40% of either the first and/or second coating is coated with one or more ceramic coating. In specific embodiments, at least 50% of either the first and/or second coating is coated with one or more ceramic coating. In more specific embodiments, at least 60% of either the first and/or second coating is coated with one or more ceramic coating. In still more specific embodiments, at least 80% of either the first and/or second coating is coated with one or more ceramic coating. In more specific embodiments, at least 90% of either the first and/or second coating is coated with one or more ceramic coating.

In some embodiments, the ceramic coating of a separator or material provided herein is a continuous coating (e.g., comprising a two-dimensional matrix on the surface of the porous polymer film, such as opposed to a plurality of ceramic particles which would be a plurality of zero dimensional ceramic materials having a non-continuous matrix). In certain embodiments, the ceramic coating comprises one or more continuous ceramic coating (e.g., having a continuous phase or matrix; e.g., as opposed to a film comprising collection of zero-dimensional, one-dimensional, or low aspect ratio particles).

In certain embodiments herein, any membrane, film, separator, fiber or porous material comprising a polymer material or matrix and having a surface thereof has at least a portion of the surface coated with ceramic (e.g., a non-particulate based and/or two-dimensional and/or continuous ceramic coating). In specific embodiments, at least 20% of the surface is coated with ceramic. In more specific embodiments, at least 40% of the surface is coated with ceramic. In still more specific embodiments, at least 60% of the surface is coated with ceramic. In yet more specific embodiments, at least 80% of the surface is coated with ceramic. In more specific embodiments, at least 90% of the surface is coated with ceramic. In still more specific embodiments, at least 95%, at least 98%, or at least 99% of the surface is coated with ceramic.

In various instances, good surface coverage of the polymeric material with ceramic provides for a number of benefits to a hybrid/composite material. For example, in some instances, good ceramic coverage improved ionic mobility of the material (e.g., and in turn rate capability and/or capacity of a battery comprising the same), wettability (e.g., reducing the need for excess electrolyte, e.g., reducing the cost and volume of the overall cell), improving mechanical properties (e.g., tensile strength in the medial (md) and/or transverse (td) directions) (e.g., improving processability, reducing probability of damage caused during use, and/or improving safety parameters), improving thermal stability (e.g., reducing shrinkage at elevated temperatures, e.g., improving safety parameters), and/or other beneficial characteristics.

In some embodiments, a membrane, separator, film, or the like provided herein comprising a polymer material or matrix comprises one or more ceramic domain embedded within the polymer matrix or material. In certain embodiments, the embedded ceramic domain(s) comprise discrete domains and/or continuous domains. In some embodiments, the domains embedded within the polymer are completely embedded within the polymer and/or extend to the surface of the polymer material/matrix (e.g., connecting with a surface ceramic coat). In certain embodiments, discrete domains are (e.g., isolated) zero dimensional or lower aspect ratio one-dimensional domains, such as having an aspect ratio of less than 10. In some embodiments, continuous domains are two-dimensional or higher aspect ratio (e.g., ≥10) one-dimensional domains.

As with surface ceramic coatings, in some instances, inclusion of embedded ceramic domains within the polymer matrix of a material provided herein provides for a number of benefits to a polymer-ceramic hybrid/composite material. For example, in some instances, ceramic embedded domains improve ionic mobility through the material (e.g., and in turn rate capability and/or capacity of a battery comprising the same), improve mechanical properties (e.g., tensile strength in the medial (md) and/or transverse (td) directions) (e.g., improve processability, reduce probability of damage caused during use, and/or improve safety parameters), improve thermal stability (e.g., reduce shrinkage at elevated temperatures, e.g., improve safety parameters), and/or other beneficial characteristics. In specific embodiments, a ceramic coat, along with embedded ceramic materials are preferred in materials provided herein. In some embodiments, the combination of both ceramic inclusions in the material provide for very high performance materials. In specific instances, inclusion of surface ceramic along with embedded ceramic domains greatly improves ionic conductivity of the separator/membrane/film, such as to facilitate excellent rate and capacity parameters of a material, even when materials with low porosity (e.g., about 40% or less) are utilized.

In some embodiments, polymer provided in a material (e.g., separator, membrane, film, fiber, mat, or the like) herein has a high degree of amorphous content. In specific embodiments, polymer provided in a material herein has is about 10 wt. % or more amorphous. In more specific embodiments, polymer provided in a material herein has is about 30 wt. % or more amorphous. In still more specific embodiments, polymer provided in a material herein has is about 50 wt. % or more amorphous. In certain instances, the embedded ceramic retards crystallization of the polymer (e.g., polymer matrix) material of a separator, membrane, film, etc. provided herein, such as during precipitation/solidification from a fluid stock during a process described herein (e.g., during concentrating, drying, and/or curing thereof). In some instances, low crystallinity of the polymer further facilitates performance characteristics of a material, such as ionic mobility, wettability, and/or the like of a material provided herein.

In various embodiments herein, any suitable amount of polymer and/or ceramic are utilized in the materials described herein. In specific embodiments, suitable amounts of polymer and ceramic are provided in the materials herein to achieve the morphologies described herein. In some embodiments, a material (e.g., separator, membrane, film, fiber mat, or the like) described herein comprises about 30 wt. % to about 99 wt. % polymer. In more specific embodiments, the material comprises about 40 wt. % to about 90 wt. % polymer. In still more specific embodiments, a material (e.g., a film or film separator) provided herein comprises about 50 wt. % to about 80 wt. % polymer. In some specific embodiments, a material (e.g., mat or mat separator) provided herein comprises about 70 wt. % to about 90 wt. % polymer (e.g., about 70 wt. % to about 85 wt. %). In some embodiments, a material (e.g., separator, membrane, film, fiber mat, or the like) described herein comprises about 1 wt. % to about 70 wt. % ceramic. In specific embodiments, the material comprises about 20 wt. % to about 50 wt. % ceramic. In some specific embodiments, a material (e.g., a film or film separator) provided herein comprises about 20 wt. % to about 50 wt. % (e.g., about 30 wt. % to about 50 wt. %) ceramic. In some specific embodiments, a material (e.g., mat or mat separator) provided herein comprises about 10 wt. % to about 30 wt. % ceramic (e.g., about 15 wt. % to about 30 wt. %).

In certain embodiments, a material (e.g., film or fiber) provided herein comprises a polymer matrix with a ceramic coating, such as described herein. In specific embodiments, the ceramic coating has any suitable thickness to impart a beneficial characteristic(s) to the material, such as one of the many described herein. In some embodiments, the material has a (e.g., average) thickness (e.g., diameter of a fiber or thickness of a two-dimensional film), the polymer matrix (e.g., including any ceramic embedded therein) having a first thickness and the coating having a second thickness. In some instances, such as wherein a film is coated on both sides with ceramic or a fiber is coated all the way around the fiber, a material has a polymer thickness, a first coating thickness and a second coating thickness. In some embodiments, the (e.g., average) thickness of a ceramic coating is about 30% or less of the (e.g., average) thickness of material (e.g., separator, film, fiber, or the like). In specific embodiments, the (e.g., average) thickness of a ceramic coating is about 20% or less of the (e.g., average) thickness of material. In more specific embodiments, the (e.g., average) thickness of a ceramic coating is about 20% or less of the (e.g., average) thickness of material. In still more specific embodiments, the (e.g., average) thickness of a ceramic coating is about 15% or less of the (e.g., average) thickness of material. In yet more specific embodiments, the (e.g., average) thickness of a ceramic coating is about 8% to about 12% (e.g., about 10%) of the (e.g., average) thickness of material. In certain embodiments, the (e.g., average) thickness of the ceramic coating is at least 1% (e.g., at least 2%, at least 3%, at least 5%, or the like) of the overall (e.g., average) thickness of the material.

Any suitable polymer is utilized in the separators, membranes, films, fibers, mats, and the like described herein. In preferred embodiments, the polymer is a polymer compatible with one or more battery electrolyte, such as a lithium ion battery electrolyte. In certain embodiments, the polymer is polyvinyl alcohol (PVA), polyacrylonitrile (PAN), polyvinylidene difluoride (PVDF), polyvinylpyrrolidone (PVP), polyimide (PI), or a combination thereof. In specific embodiments, the polymer is PAN or PVDF.

Any suitable ceramic is utilized in the separators, membranes, films, fibers, mats, and the like described herein. In certain embodiments, the ceramic is a precursor derived ceramic, such as a ceramic derived from a ceramic precursor that is liquid or soluble in or (e.g., at least partially) miscible with water, aqueous solutions, alcohol, dimethylformamide (DMF), combinations thereof, or the like. In certain embodiments, the ceramic is a silicon based ceramic, such as a silicon-oxycarbonnitride (SiCNO) ceramic, a silicon-oxycarbide (SiCO) ceramic, a silicon-carbonnitride (SiCN) ceramic, a silicon-oxynitride (SiNO) ceramic, a silicon oxide (SiOx) ceramic, a silicon nitride (SiNx) ceramic, a silicon carbide (SiCx) ceramic, combinations thereof, or the like. In certain embodiments, the ceramic is a polymer derived ceramic (PDC) (or precursor thereof), such as a polysilazane, a poly(organosilazane), a poly(organosilylcarbodiimide), a poly(organosiloxane), any combination thereof, or the like, or a ceramic derived thereof. In some embodiments, the ceramic is a sol-gel derived ceramic, such as a ceramic derived from silicic acid (e.g., orthosilicic acid, disilicic acid, metasilicic acid, pyrosilicic acid, or combinations thereof), or an alkylated derivative thereof, such as tetraethyl orthosilicate (TEOS), tetramethyl orthosilicate (TMOS), or the like. In various embodiments, other ceramics are derived from precursors such as silicon salts, such as silicon acetate, silicon chloride, or the like.

In certain embodiments, materials (e.g., separators, films, membranes, and systems thereof) provided herein have good thermal stability. In some embodiments, materials have a shrinkage (e.g., in either or both the machine direction (md) and/or transverse direction) of less than 3% at 90° C. (e.g., after 1 hour). In specific embodiments, materials herein have a shrinkage of less than 2% at 90° C. (e.g., after 1 hour). in more specific embodiments, materials herein have a shrinkage of less than 1% at 90° C. (e.g., after 1 hour). In still more specific embodiments, materials herein have a shrinkage of less than 0.5% at 90° C. (e.g., after 1 hour). In yet more specific embodiments, materials herein have a shrinkage of less than 0.2% at 90° C. (e.g., after 1 hour). By contrast, typical commercial separator materials have shrinkages (in the machine direction) of about 5% or greater at 90° C. For example, CELGARD® 2325 (25 micron microporous trilayer membrane (PP/PE/PP)) has an MD shrinkage at 90° C. of 5% after 1 hour, CELGARD® 2340 (38 micron microporous trilayer membrane (PP/PE/PP)) has an MD shrinkage at 90° C. of 7% after 1 hour, and CELGARD® 2400 (25 micron microporous monolayer membrane (PP)) has an MD shrinkage at 90° C. of 5% after 1 hour. In some embodiments, materials have a shrinkage (e.g., in either or both the machine direction (md) and/or transverse direction) of less than 20% at a temperature of at least 200° C. (e.g., after 1 hour). In specific embodiments, materials herein have a shrinkage of less than 15% at a temperature of at least 200° C. (e.g., after 1 hour). in more specific embodiments, materials herein have a shrinkage of less than 10% at a temperature of at least 200° C. (e.g., after 1 hour). In still more specific embodiments, materials herein have a shrinkage of less than 5% at a temperature of at least 200° C. (e.g., after 1 hour). In yet more specific embodiments, materials herein have a shrinkage of less than 3% at a temperature of at least 200° C. (e.g., after 1 hour). In more specific embodiments, materials herein have a shrinkage of less than 2% at a temperature of at least 200° C. (e.g., after 1 hour).

In certain embodiments, a material (e.g., separator, membrane, or film) provided herein has a strain of less than ±20% (i.e., between −20% and +20% (shrinkage and expansion)) at a temperature of at least 200° C. and a controlled force of 0.001 N (e.g., in longitudinal (md) and/or transverse directions (td)). In specific embodiments, the material has a strain of less than ±10% at a temperature of at least 200° C. and a controlled force of 0.001 N (e.g., in longitudinal (md) and/or transverse directions (td)). In more specific embodiments, the material has a strain of less than ±5% at a temperature of at least 200° C. and a controlled force of 0.001 N (e.g., in longitudinal (md) and/or transverse directions (td)). In still more specific embodiments, the material has a strain of less than ±3% at a temperature of at least 200° C. and a controlled force of 0.001 N (e.g., in longitudinal (md) and/or transverse directions (td)). In yet more specific embodiments, the material has a strain of less than ±2% at a temperature of at least 200° C. and a controlled force of 0.001 N (e.g., in longitudinal (md) and/or transverse directions (td)).

In certain embodiments, the materials (e.g., separator, membrane, or film) provided herein have good air permeability (e.g., demonstrating good fluid flow characteristics thereof). In some embodiments, the materials have an air flow rate (e.g., therethrough) of at least 10 mL/s at a differential pressure of 35 pounds per square inch (psi). In specific embodiments, the materials have an air flow rate (e.g., therethrough) of at least 20 mL/s at a differential pressure of 35 psi. In more specific embodiments, the materials have an air flow rate (e.g., therethrough) of at least 30 mL/s at a differential pressure of 35 psi. In still more specific embodiments, the materials have an air flow rate (e.g., therethrough) of at least 40 mL/s at a differential pressure of 35 psi.

Also provided in certain embodiments herein are energy storage devices comprising a material (e.g., separator, membrane, or film and systems thereof) described herein. In certain embodiments, an energy storage device (e.g., battery, such as a lithium battery, e.g., lithium ion battery) comprises a first electrode (e.g. positive electrode), a second electrode (e.g., a negative electrode), and a separator or electrolyte system described herein. In specific embodiments, the separator or electrolyte system is positioned between (e.g., as a physical barrier) between the first and second electrode.

In certain embodiments, energy storage devices proved herein have very good rate capabilities (e.g., that retain good and reversible energy storage capacities, even at fast charge rates).

Provided in certain embodiments herein are process for manufacturing materials (e.g., separators, membranes, films, fibers, mats, or the like) described herein. In some embodiments, the process comprises gas-assisted ejection of a fluid stock from a conduit. In specific embodiments, the conduit is a part of a gas-assisted nozzle, the conduit comprising an inlet and an outlet and the gas assisted nozzle configured to provide a high velocity gas at or near the outlet of the conduit. In certain embodiments, the nozzle is configured to receive a voltage, such as to facilitate electrospinning and/or electrospraying of a fluid stock therethrough. More details of such processing techniques can be found in co-pending U.S. Provisional Patent Application entitled "Hybrid Separators and the Manufacture Thereof" by Joo et al., which is hereby incorporated herein in its entirety.

In some embodiments, the ceramic or polymer derived ceramic precursor provided herein has any suitable molecular weight. For example, in certain embodiments, the polymer has a molecular weight of at least 5,000 atomic mass units ("amu"), at least 10,000 amu, at least 20,000 amu, at least 50,000 amu, and the like.

Further, provided herein is a process for preparing an electrolyte system, a separator system, or battery (e.g., lithium battery, such as a lithium ion or lithium sulfur battery). In specific embodiments, the process comprises:
a. providing a separator membrane;
b. providing a liquid electrolyte to the separator membrane;
c. providing a functionalized ceramic (e.g., polymer derived ceramic (PDC) (or precursor thereof) (e.g., cross-linkable organo-polymer derived ceramic precursor, such as described herein)) to the separator membrane; and
d. cross-linking the functionalized ceramic.

In specific embodiments, the process further comprises providing at least one electrode and configuring the separator in proximity to the at least one electrode. In more specific embodiments, the process comprises providing a first and a second electrode and configuring the separator in proximity to both the first and second electrodes (e.g., configuring the separator between the first and second electrodes). In some embodiments, the ceramic (e.g., and the liquid electrolyte) is provided to the separator membrane following bringing the separator in proximity to the at least one electrode. In specific embodiments, crosslinking of the ceramic (e.g., polymer derived ceramic or precursor thereof) is performed following bringing the membrane in proximity to the at least one electrode and providing the ceramic to the membrane. In some instances, such a process facilitates providing a semi-solid electrolyte system in direct contact with the electrode material. In specific instances, such contact facilitates good performance characteristics while also providing good safety characteristics. In particular instances, such as wherein a lithium metal electrode is utilized, formation of the semi-solid electrolyte system and/or separator system in contact with the electrode facilitates retardation and/or prevention of the formation of lithium dendrites on the surface of the lithium metal containing electrode.

In specific embodiments, a process of preparing a battery or system herein comprises:
a. providing a first electrode;
b. providing a separator membrane;
c. configuring the separator membrane in proximity to the first electrode to form a layered assembly;
d. charging the layered assembly with (i) a liquid electrolyte; and (ii) a (crosslinkable) polysilsesquioxane; and
e. crosslinking the polysilsesquioaxane to form a semi-solid electrolyte system (e.g., comprising crosslinked-polysilsesquioxane three dimensional matrix, the liquid electrolyte configured within the three dimensional matrix).

In specific embodiments, a process of preparing a battery (e.g., lithium battery) or system herein comprises:
a. providing a first electrode;
b. providing a second electrode;
c. providing a separator membrane;
d. configuring the separator membrane between the first and second electrodes to provide a cell assembly;
e. charging the cell assembly with (i) a liquid electrolyte; and (ii) a (crosslinkable) polysilsesquioxane; and
f. crosslinking the polysilsesquioaxane to form a semi-solid electrolyte system (e.g., comprising crosslinked-polysilsesquioxane three-dimensional matrix, the liquid electrolyte configured within the three dimensional matrix).

In various embodiments, electrodes, separator membranes, liquid electrolytes and ceramics (or precursors thereof) are as described in the instant disclosure. In some embodiments, cross-linking of a functionalized ceramic herein is achieved by any suitable mechanism, such as initiation by photoinitiation (e.g., with UV), chemical initiation (e.g., with an initiation, such as AIBN), or the like.

In certain embodiments, provided herein is a battery comprising an electrolyte and/or separator system provided herein and/or is prepared according to a process described herein. In certain embodiments, the battery further comprises one or more electrode, such as a graphite and/or silicon containing electrode, a lithium metal oxide containing electrode, a sulfur containing electrode, a lithium metal containing electrode, or a combination thereof. In specific embodiments, the battery is a lithium battery. In more specific embodiments, the battery is a secondary (rechargeable) lithium battery. In still more specific embodiments, the battery is a lithium ion battery or a lithium sulfur battery.

In certain embodiments, electrolytes, electrolyte systems, or separator systems, as well as processes used herein, comprise or comprise the use of any suitable amount of a ceramic or precursor thereof provided herein. In specific embodiments, the amount of ceramic or precursor thereof relative to the sum of the ceramic or precursor thereof and liquid electrolyte is at least 0.01 wt. %, such as about 0.1 wt. % to about 10 wt. %. In specific embodiments, the ceramic or precursor thereof is about 1 wt. % to about 8 wt. %, such as about 2 wt. % to about 5 wt. %.

EXAMPLES

Example 1: Synthesis of LPSQ

A reaction vessel is charged with 1 mol. methacryloxypropyltrimethoxysilane, potassium carbonate, water, and tetrahydrofuran (THF). The mixture is stirred at room temperature for three days to provide methacryloxypropyltrihydroxysilane. The methacryloxypropyltrihydroxysilane is condensed to form ladder-like poly(methacryloxypropyl) silsesquioxane (LPMASQ). FIG. 1 illustrates a schematic of the synthesis of the LPMASQ.

Example 2: Gel Electrolyte & Crosslinking

Figure 2:
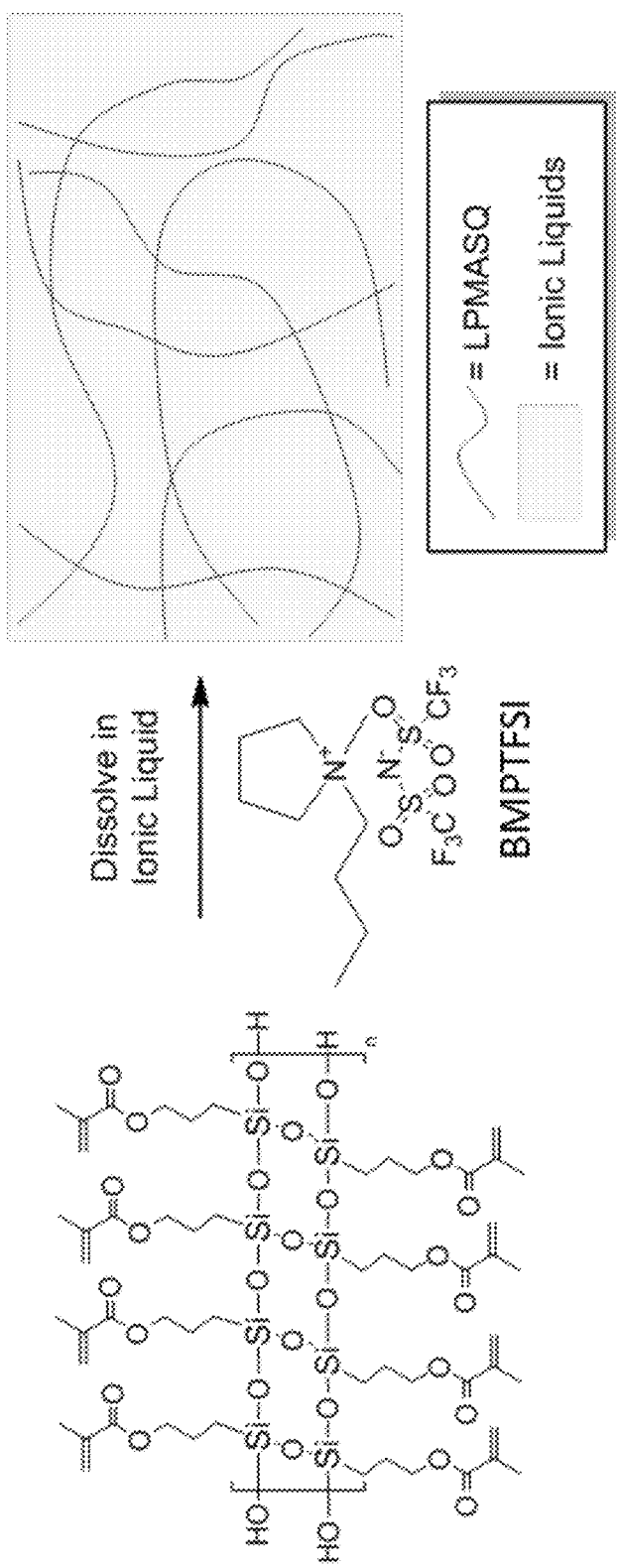
FIG. 2 illustrates a schematic of an exemplary LPMASQ cross-linking and the formation of a semi-solid (gel) electrolyte system.
Figure 2:
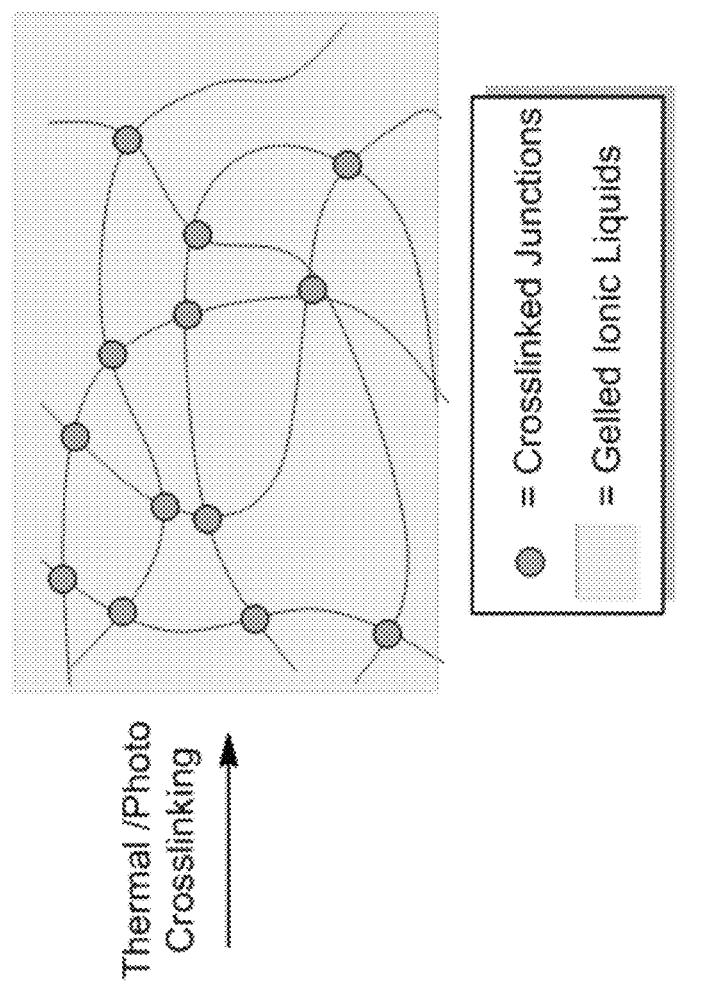

Ladder-like poly(methacryloxypropyl)silsesquioxane (LPMASQ) is combined with an ionic liquid (e.g., N-butyl-N-methylpyrrolidinium bis(trifluoromethylsulfonyl)imide (BMPTFSI)). Gel electrolytes are formed by thermal/photo crosslinking of methacryl groups to form a three-dimensional matrix within which the ionic liquid is configured/retained, such as illustrated in FIG. 2. A first gel electrolyte is prepared using 2 wt. % LPMASQ and a second gel electrolyte is prepared using 5 wt. % LPMASQ.

Figure 3:
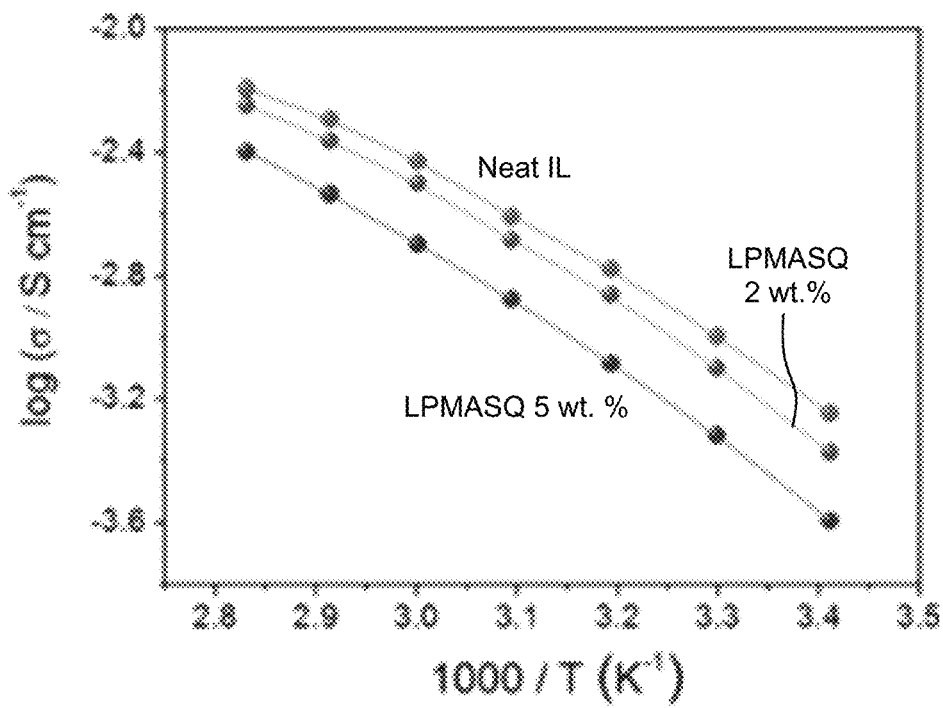
FIG. 3 illustrates a chart of the ionic conductivity of exemplary semi-solid electrolyte system herein compared to ionic liquids alone.

Ionic conductivity of the gel electrolyte systems is tested and compared to the ionic conductivity of the liquid electrolyte (ionic liquid) absent the gelling matrix material (i.e., the cross-linked LPMASQ). As is illustrated in FIG. 3, the ionic conductivity of the semi-solid electrolyte system is comparable to the ionic conductivity of the ionic liquid in purely liquid form. However, as seen, with increasing cross-linked gelling agent (from 2 wt. % to 5 wt. %), a decrease in ionic conductivity of the electrolyte is decreased.

Example 2a

Ladder-like poly(polyethyleneoxide-co-methacryloxypropyl) silses-quioxane (LPEOMASQ), is prepared with a liquid electrolyte as described in Example 2 and similarly crosslinked. A first gel electrolyte is prepared using 5 wt. % LPEOMASQ with a polyethyleneoxide-to-methacryloxypropyl monomeric (number) ratio of 1:3 (LPEOMASQ25), 1:1 (LPEOMASQ50), and 3:1 (LPEOMASQ75).

Figure 11:
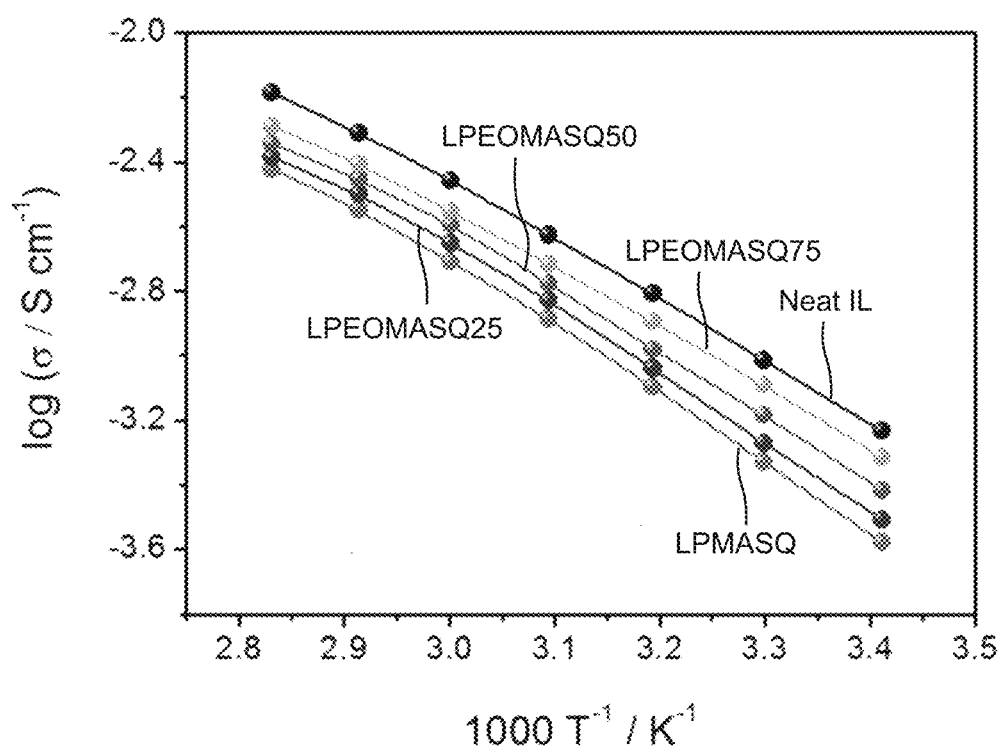
FIG. 11 illustrates the ionic conductivity of the semi-solid electrolyte systems are comparable to the ionic conductivity of the ionic liquid in purely liquid form

Ionic conductivity of the gel electrolyte systems are tested and compared to the ionic conductivity of the liquid electrolyte (ionic liquid) absent the gelling matrix material and to a system comprising 5 wt. % cross-linked LPMASQ. As is illustrated in FIG. 11, the ionic conductivity of the semi-solid electrolyte systems are comparable to the ionic conductivity of the ionic liquid in purely liquid form, with the systems comprising polyethylene oxide demonstrating increased ionic conductivity with increased polyethylene oxide content.

Example 3: Crosslinking and Evaluation

Figure 4:
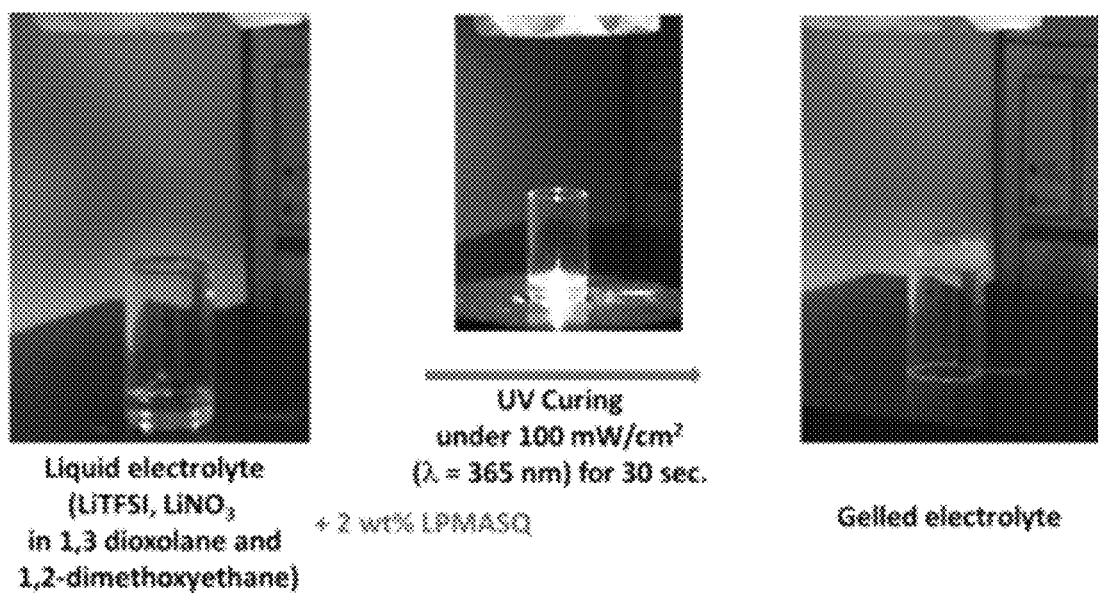
FIG. 4 illustrates exemplary samples of gelled electrolytes and precursors thereof, as well as exemplary processes whereby gelled electrolytes are prepared.

Photocuring experiments of the current liquid electrolyte based on LiTFSI, LiNO3, 1,3 dioxolane (DOL) and 1,2-dimethoxyethane (DME)) with 2 wt % LPMASQ and Igracure 184 photoinitiator is conducted on a Hitachi USHIO UV lamp system. The lamp intensity is 100 mW/cm2($\lambda$=365 nm) and the irradiation time is 30 sec. As shown in FIG. 4, the DOL-DME based liquid electrolyte is gelled. The rheological, FT-IT is to probe the gel state, and measure the conductivity as well as electrochemical stability and interfacial stability toward lithium metal test (LSV and time evolution of the AC impedance spectra or CV), and Li—S cell tests (rate, cycle test together with impedance analysis (change in charge transfer resistance). Short circuit experiment (Tsc) and SEM images for lithium metal before and after cycling as well as nanoindentation study for elastic modulus value (>6.2 GPa) for dendrite suppression is evaluated.

Figure 14:
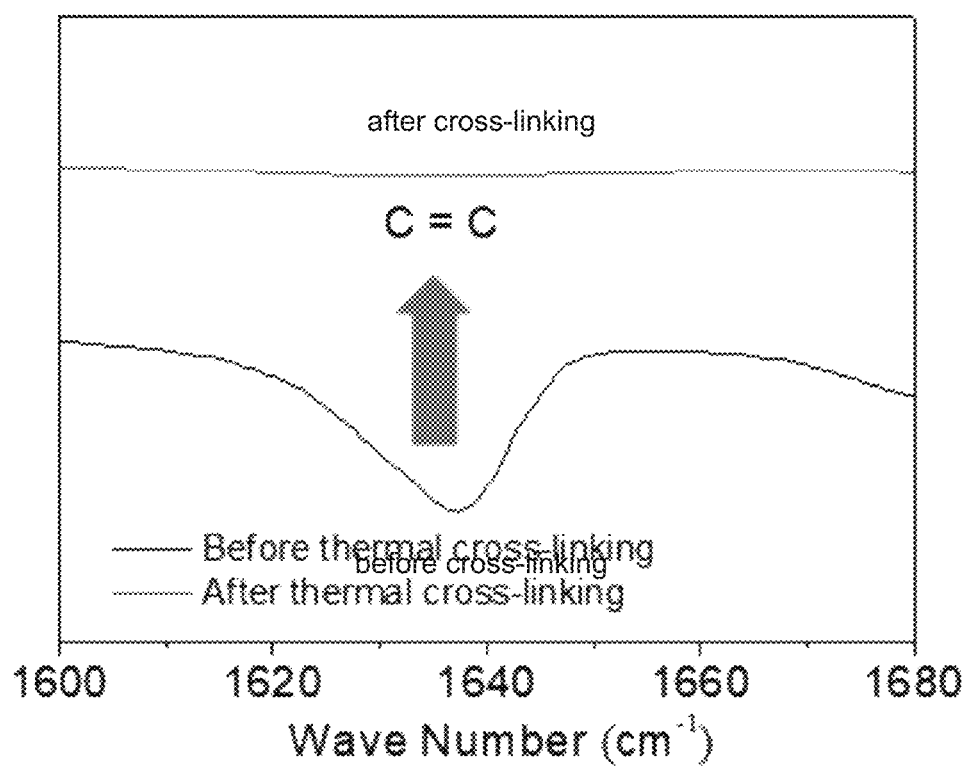
FIG. 14 illustrates an FTIR trace of the C=C band in the 1620-1640 cm-1 range, with the C=C stretching no longer observed following cross-linking of the LPMASQ.

Thermal curing is alternatively conducted, to achieve comparable results. FIG. 14 illustrates an FTIR trace of the C=C band in the 1620-1640 cm-1 range, with the C=C stretching no longer observed following cross-linking of the LPMASQ.

Example 4: Battery System

Figure 5:
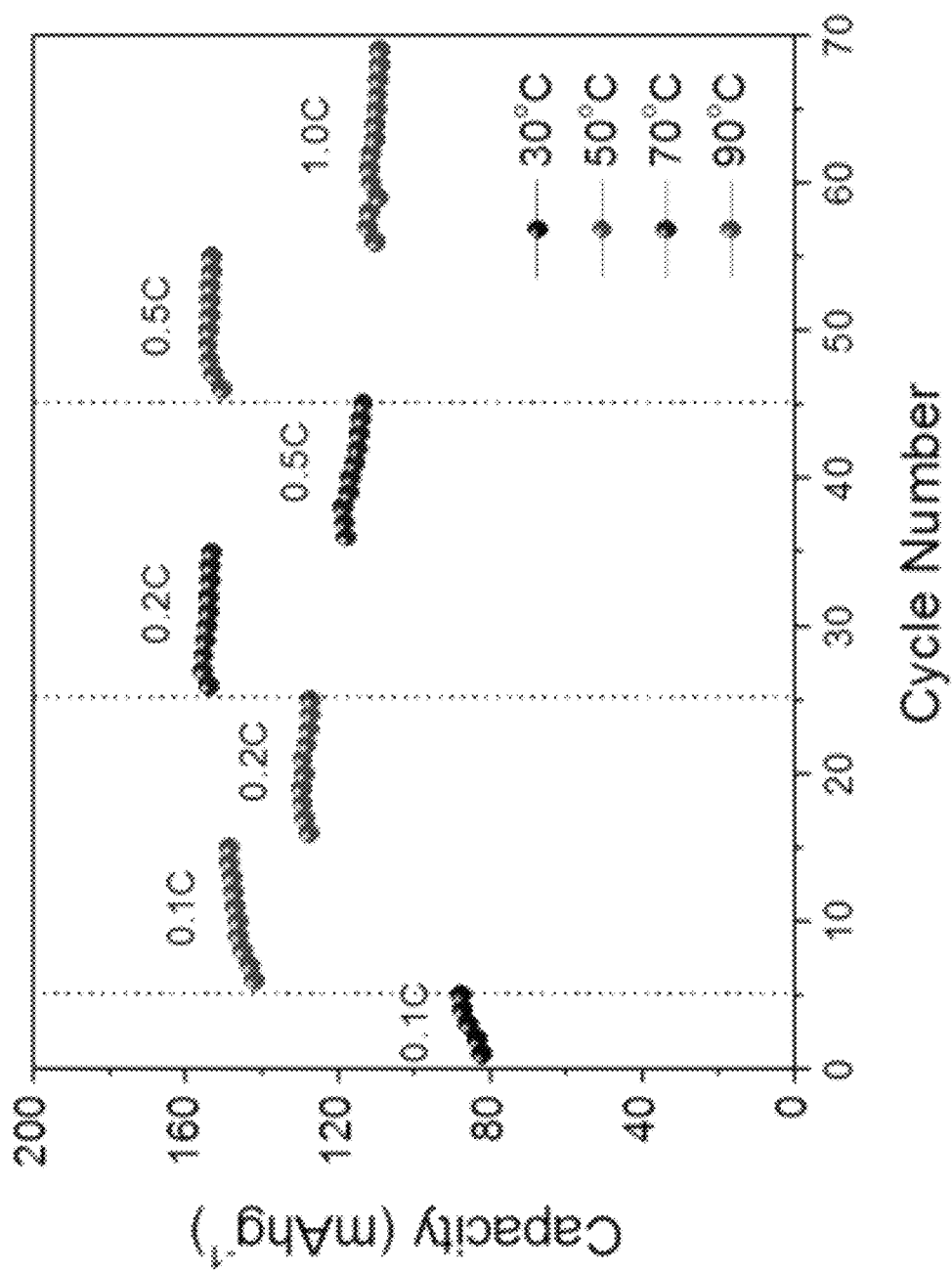
FIG. 5 illustrates exemplary cell performance capacities of the gelled electrolyte at various temperatures (0.1 C at 30° C.), (0.1 C and 0.2 C at 50° C.), (0.2 C and 0.5 C at 70° C.), and (0.5 C and 1.0 C at 90° C.).

A battery (half) cell is prepared using a lithium metal electrode, a lithium iron phosphate (LiFePO4) counter electrode, and the gel electrolytes of Example 2. As is illustrated in FIG. 5, the cells perform well, even at temperatures of up to 90° C. and rates of 1C (i.e., full charge or discharge in 1 hour).

Example 5: Synthesis & Testing of LPSQ Co-Polymer

Using a process similar to that described in Example 1, a reaction vessel is charged with 1 mol. methacryloxypropyltrimethoxysilane and 1 mol. methylpolyethylene oxidepropyltrimethoxysilane to provide a mixture of methacryloxypropyltrihydroxysilane and 1 mol. methylpolyethylene oxide propyltrihydroxysilane, which are then condensed to form a ladder-like poly(polyethyleneoxide-co-methacryloxypropyl) silsesquioxane (LPEOMASQ), such as illustrated in FIG. 6.

Example 6: Gel Electrolyte & Crosslinking

Figure 7:
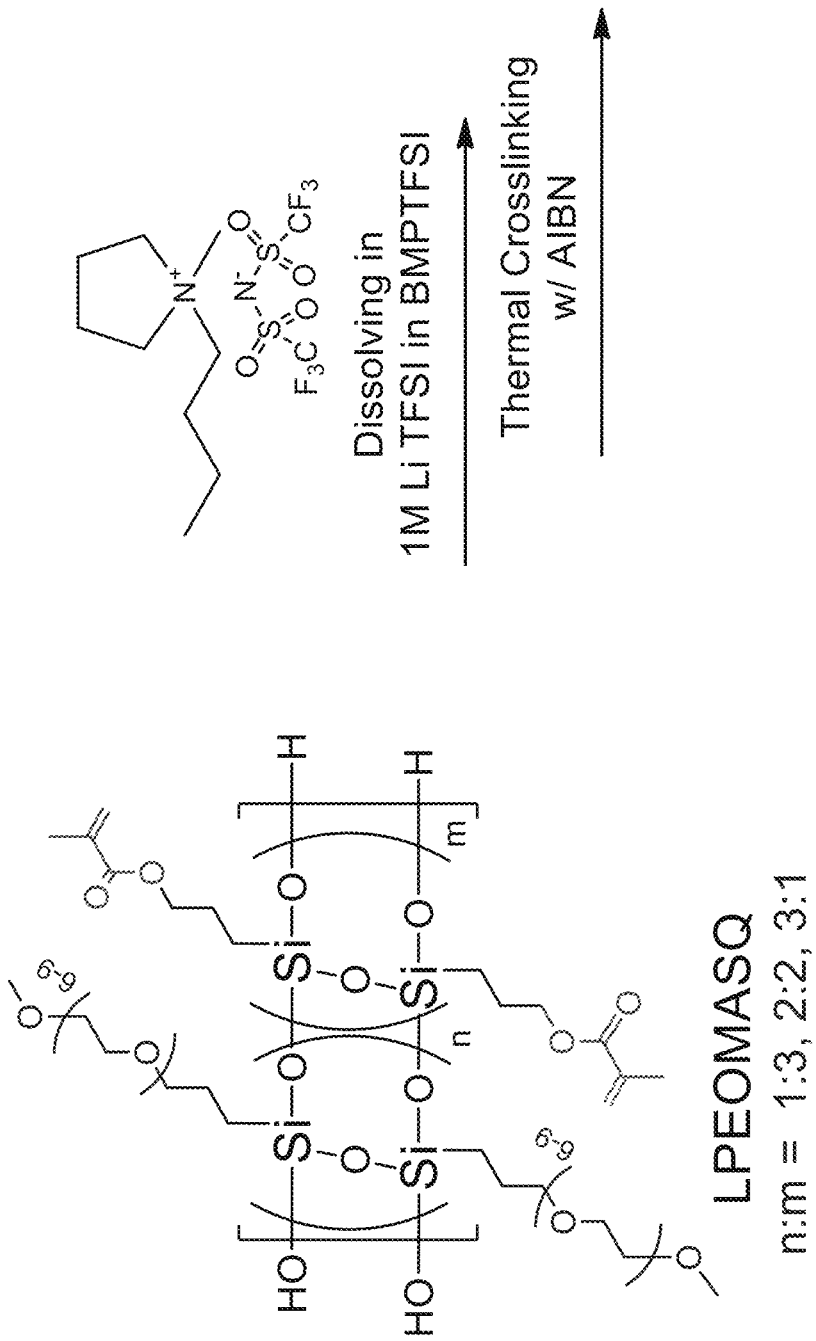
FIG. 7 illustrates a schematic of an exemplary LPMASQ cross-linking and the formation of a semi-solid (gel) electrolyte system.
Figure 7:
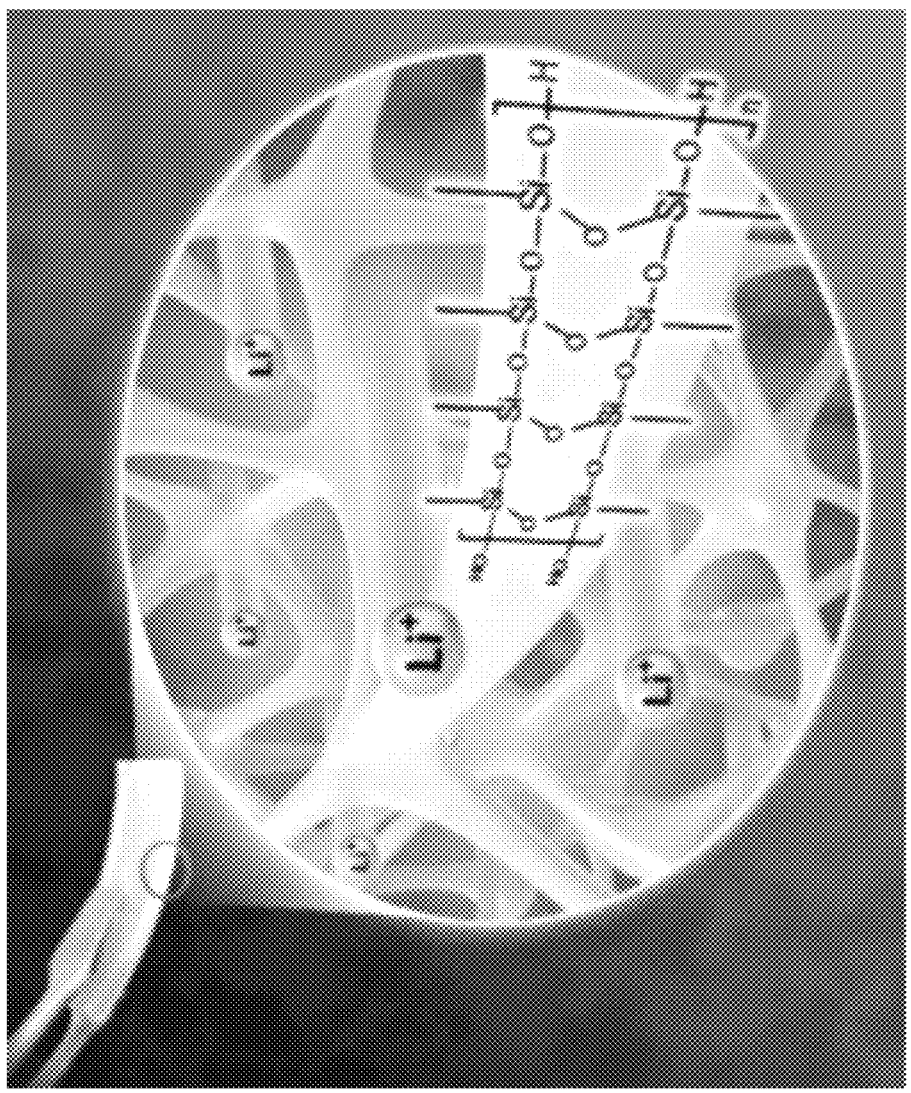

Using a process similar to that of Example 2, a ladder-like poly(polyethyleneoxide-co-methacryloxypropyl) silsesquioxane (LPEOMASQ) is combined with an ionic liquid (e.g., N-butyl-N-methylpyrrolidinium bis(trifluoromethylsulfonyl)imide (BMPTFSI)). Gel electrolytes are formed by thermal/photo crosslinking of methacryl groups to form a three-dimensional matrix within which the ionic liquid is configured/retained, such as illustrated in FIG. 7.

In some instances, we utilize the LPSQ functionalized with cross-linkable, highly ionic conducting chains (PEO) to improve the ionic conductivity. The synthesis of LPEOMASQ [ladder-like poly(polyethyleneoxide-co-methacryloxypropyl) silsesquioxane] where 6 to 9 units of PEO is added to LPSQ. In addition, the preparation of ionogels through thermal/photo crosslinking is carried out. The ratio of PEO chain (n) to methacryloxypropyl chain (m) is varied to achieve higher ionic conductivity of the gel electrolyte system. Rheological, FT-IT, electrochemical and interfacial stability, short circuit, nanoindentation, and Li—S cell tests, such as described in Example 3 are performed.

Example 7: Lithium Sulfur Battery

A lithium sulfur batter is prepared using a gelled electrolyte of Example 2 and Example 6 (with a sulfur based cathode and a lithium metal anode). The membrane efficiency to deter polysulfide migration and the membrane surface is monitored. To ensure the membrane efficiency is quantified, the cells are intentionally spiked with excess Li2S or S8 in the cathode electrolyte. These spiked cells are evaluated under cycling and noncycling conditions to evaluate the separator under extreme conditions. Using polysulfides detected in the anode solution, the sulfide peak height is ratioed against the same peak height in the cathode solution to provide a quantifiable permeation percentage. Raman probes on side of the Celgard K814 are used identify the presence of any electrolytic degradation products or polysulfide materials binding to the surface (e.g., and effectively reduce the electron transfer efficiency of the battery).

Figure 12:
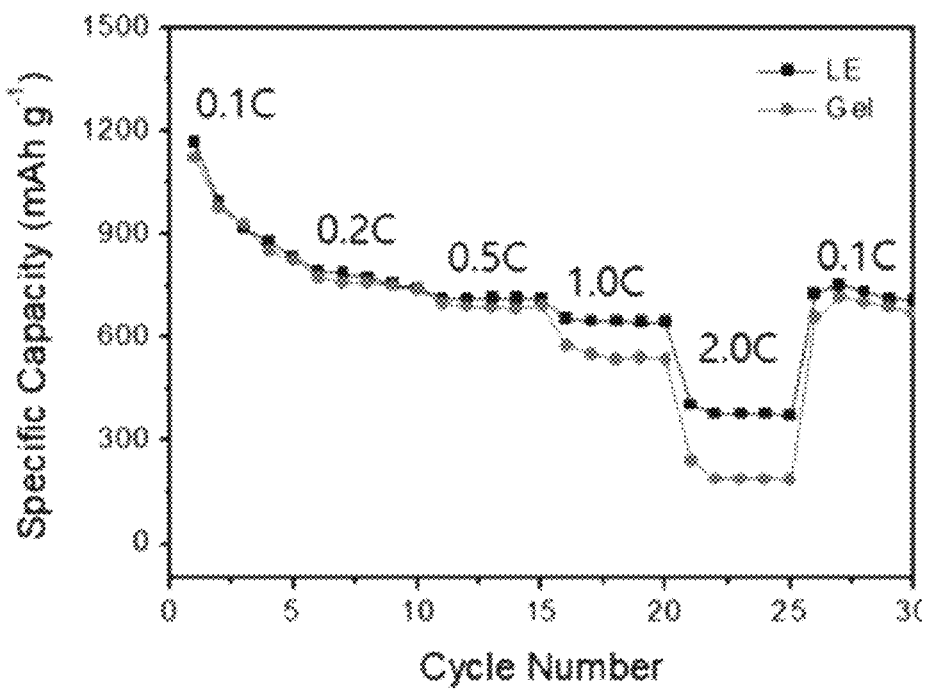
FIG. 12 illustrates illustrates the rate capability of lithium sulfur batteries prepared using liquid electrolyte (LE) and exemplary gelled polymer electrolyte (GPE) systems described herein.
Figure 13:
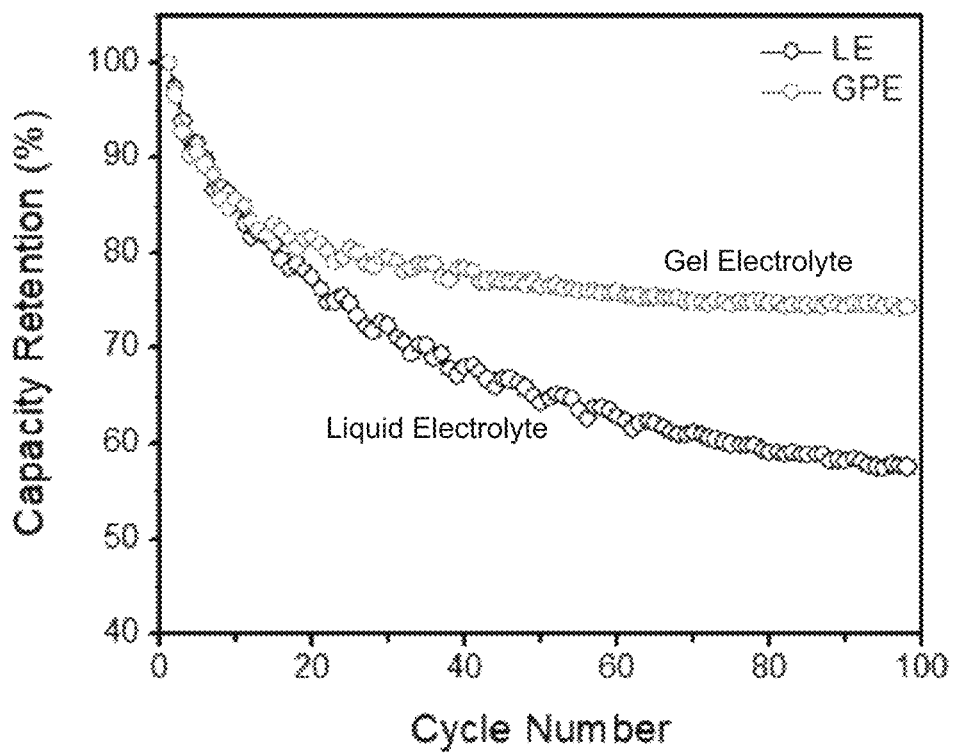
FIG. 13 illustrates the capacity retention (at 0.2C) of a liquid electrolyte compared to a gel electrolyte system described herein.

FIG. 12 illustrates the rate capability of lithium sulfur batteries prepared using liquid electrolyte (LE) and exemplary gelled polymer electrolyte (GPE) systems described herein. Gel electrolyte systems demonstrate excellent rate capabilities, with nearly identical rate capacities up to 0.5 C, comparable capacities at 1 C, and good capacities even at 2 C. Such rate capabilities are excellent when considering the safety benefits achieved by using a gel system over a liquid system, such as reduced electrolyte leakage in compromised cells (e.g., which can lead to toxic contamination, short circuiting, fire, etc.). FIG. 13 demonstrates the capacity retention (at 0.2 C) of a liquid electrolyte compared to a gel electrolyte system described herein. As demonstrated, the capacity retention of otherwise identical systems shows significant improvement when using the gelled electrolyte system, as compared to a liquid electrolyte system.

What is claimed is:

1. A semi-solid electrolyte system comprising (i) a polysilsesquioxane, and (ii) a liquid electrolyte, the polysilsesquioxane being at least partially crosslinked to form a three-dimensional matrix, the liquid electrolyte being configured within the three-dimensional matrix, and wherein the polysilsesquioxane is:
   functionalized by one or more functional groups with high ionic conductivity.

2. The electrolyte system of claim 1, wherein the polysilsesquioxane is a ladder-like polysilsesquioxane (LPSQ) or a polyhedral oligomeric polysilsesquioxane (PSSQ).

3. The electrolyte system of claim 1, wherein the polysilsesquioxane is functionalized by one or more cross-linked or cross-linkable functional groups or by one or more functional group comprising polymerized alkylene or epoxide group.

4. The electrolyte system of claim 1, wherein the polysilsesquioxane is ladder-like poly(polyoxoalkylene-co-(alk)acryloxyalkyl) silsesquioxane or is ladder-like poly(polyethyleneoxide-co-methacryloxypropyl) silsesquioxane (LPEOMASQ).

5. The electrolyte system of claim 1, wherein the electrolyte is an ionic liquid.

6. The electrolyte system of claim 1, wherein the number ratio of cross-linked or cross-linkable functional groups to functional groups with high ionic conductivity is about 1:99 to about 99:1.

7. The electrolyte system of claim 1, wherein the number ratio of cross-linked or cross-linkable functional groups to functional groups with high ionic conductivity is about 1:10 to about 10:1.

8. The electrolyte system of claim 1, wherein the number ratio of cross-linked or cross-linkable functional groups to functional groups with high ionic conductivity is about 1:3 to about 3:1.

9. The electrolyte system of claim 1, wherein the number ratio of cross-linked or cross-linkable functional groups to functional groups with high ionic conductivity is about 1:1.

10. The electrolyte system of claim 1, wherein the semi-solid is a gel.

11. The electrolyte system of claim 1, wherein the weight ratio of the liquid electrolyte to the polysilsesquioxane is at least 10:1.

12. A separator system comprising
   a. a semi-solid electrolyte of claim 1; and
   b. a porous membrane, the semi-solid electrolyte being configured within the three-dimensional matrix.

13. The separator system of claim 12, wherein the separator system is a battery separator system, a lithium battery separator system, a lithium ion battery separator system, or a lithium sulfur battery separator system.

14. The separator system of claim 12, wherein the porous membrane is a polymer-ceramic composite or hybrid membrane.

15. A compound of the following formula:

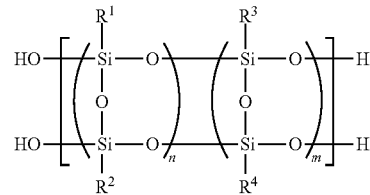

wherein,
   $R^1$ and $R^2$ are independently selected from H, alkyl, and heteroalkyl, and are optionally substituted by oxo, alkoxy, or a combination thereof, wherein $R^1$ is heteroalkyl or $R^2$ is heteroalkyl, or both $R^1$ and $R^2$ are heteroalkyl;
   $R^3$ and $R^4$ are independently selected from H, alkyl, heteroalkyl, alkylaryl, alkylarylalkyl, heteroalkylaryl, and heteroalkylarylalkyl, and are optionally substituted by oxo, alkoxy, or a combination thereof; and
   m and n are integers.

16. The compound of claim 15, wherein
   $R^3$ is alkyl, heteroalkyl, alkylaryl, alkylarylalkyl, heteroalkylaryl, or heteroalkylarylalkyl;
   $R^3$ is optionally substituted by oxo, alkoxy, or a combination thereof; and
   $R^3$ comprises at least one point of carbon-carbon unsaturation.

17. The electrolyte system of claim 1, wherein the polysilsesquioxane is functionalized by one or more polymerized acryloylalkyl, methacryloylalkyl, ethacryloylalkyl, acryloylheteroalkyl, methacryloylalkyl, or ethacryloylalkyl, or any combination thereof.

18. A semi-solid electrolyte system comprising (i) a polysilsesquioxane, and (ii) a liquid electrolyte, the polysilsesquioxane being at least partially crosslinked to form a three-dimensional matrix, the liquid electrolyte being configured within the three-dimensional matrix, and wherein the polysilsesquioxane is:
   functionalized by one or more heteroalkyl group.

19. The electrolyte system of claim 18, wherein the polysilsesquioxane is a ladder-like polysilsesquioxane (LPSQ) or a polyhedral oligomeric polysilsesquioxane (PSSQ).

20. The electrolyte system of claim 18, wherein the polysilsesquioxane is functionalized by one or more cross-linked or cross-linkable functional groups or by one or more functional group comprising polymerized alkylene or epoxide group.

21. The electrolyte system of claim 18, wherein the polysilsesquioxane is ladder-like poly(polyoxoalkylene-co-(alk)acryloxyalkyl) silsesquioxane or is ladder-like poly(polyethyleneoxide-co-methacryloxypropyl) silsesquioxane (LPEOMASQ).

22. The electrolyte system of claim 18, wherein the electrolyte is an ionic liquid.

23. The electrolyte system of claim 18, wherein the heteroalkyl group is a poly(oxoalkylene).

24. The electrolyte system of claim 18, wherein the semi-solid is a gel.

25. The electrolyte system of claim 18, wherein the weight ratio of the liquid electrolyte to the polysilsesquioxane is at least 10:1.

26. The electrolyte system of claim 18, wherein the polysilsesquioxane is functionalized by one or more polymerized acryloylalkyl, methacryloylalkyl, ethacryloylalkyl, acryloylheteroalkyl, methacryloylalkyl, or ethacryloylalkyl, or any combination thereof.

27. A semi-solid electrolyte system comprising (i) a polysilsesquioxane, and (ii) a liquid electrolyte, the polysilsesquioxane being at least partially crosslinked to form a three-dimensional matrix, the liquid electrolyte being configured within the three-dimensional matrix, and wherein the polysilsesquioxane is:
functionalized by one or more polymerized acryloylalkyl, methacryloylalkyl, ethacryloylalkyl, acryloylheteroalkyl, methacryloylalkyl, or ethacryloylalkyl, or any combination thereof.

28. The electrolyte system of claim 27, wherein the polysilsesquioxane is a ladder-like polysilsesquioxane (LPSQ) or a polyhedral oligomeric polysilsesquioxane (PSSQ).

29. The electrolyte system of claim 27, wherein the polysilsesquioxane is ladder-like poly(polyoxoalkylene-co-(alk)acryloxyalkyl) silsesquioxane or is ladder-like poly(polyethyleneoxide-co-methacryloxypropyl) silsesquioxane (LPEOMASQ).

30. The electrolyte system of claim 27, wherein the electrolyte is an ionic liquid.

31. The electrolyte system of claim 27, wherein the polysilsesquioxane is functionalized by one or more functional groups with high ionic conductivity.

32. The electrolyte system of claim 27, wherein the number ratio of cross-linked or cross-linkable functional groups to functional groups with high ionic conductivity is about 1:99 to about 99:1.

33. The electrolyte system of claim 27, wherein the number ratio of cross-linked or cross-linkable functional groups to functional groups with high ionic conductivity is about 1:10 to about 10:1.

34. The electrolyte system of claim 27, wherein the number ratio of cross-linked or cross-linkable functional groups to functional groups with high ionic conductivity is about 1:3 to about 3:1.

35. The electrolyte system of claim 27, wherein the number ratio of cross-linked or cross-linkable functional groups to functional groups with high ionic conductivity is about 1:1.

36. The electrolyte system of claim 27, wherein the one or more functional groups with high ionic conductivity is/are heteroalkyl group(s).

37. The electrolyte system of claim 34, wherein the heteroalkyl group is a poly(oxoalkylene).

38. The electrolyte system of claim 27, wherein the semi-solid is a gel.

39. The electrolyte system of claim 27, wherein the weight ratio of the liquid electrolyte to the polysilsesquioxane is at least 10:1.

40. A separator system comprising
a. a semi-solid electrolyte of claim 18; and
b. a porous membrane, the semi-solid electrolyte being configured within the three-dimensional matrix.

41. The separator system of claim 40, wherein the separator system is a battery separator system, a lithium battery separator system, a lithium ion battery separator system, or a lithium sulfur battery separator system.

42. The separator system of claim 40, wherein the porous membrane is a polymer-ceramic composite or hybrid membrane.

43. A separator system comprising
a. a semi-solid electrolyte of claim 27; and
b. a porous membrane, the semi-solid electrolyte being configured within the three-dimensional matrix.

44. The separator system of claim 43, wherein the separator system is a battery separator system, a lithium battery separator system, a lithium ion battery separator system, or a lithium sulfur battery separator system.

45. The separator system of claim 43, wherein the porous membrane is a polymer-ceramic composite or hybrid membrane.

46. The compound of claim 15, wherein $R^1$ is heteroalkyl.
47. The compound of claim 15, wherein $R^2$ is heteroalkyl.
48. The compound of claim 15, wherein $R^1$ and $R^2$ are heteroalkyl.

* * * * *

UNITED STATES PATENT AND TRADEMARK OFFICE
CERTIFICATE OF CORRECTION

| | | |
|---|---|---|
| PATENT NO. | : 11,626,617 B2 | Page 1 of 1 |
| APPLICATION NO. | : 16/614122 | |
| DATED | : April 11, 2023 | |
| INVENTOR(S) | : Joo et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 714 days.

Signed and Sealed this
Thirty-first Day of December, 2024

Derrick Brent
*Acting Director of the United States Patent and Trademark Office*